(12) United States Patent
Gutensohn et al.

(10) Patent No.: US 12,322,048 B2
(45) Date of Patent: Jun. 3, 2025

(54) CONNECTING SPATIALLY DISTINCT SETTINGS

(71) Applicant: Apple Inc., Cupertino, CA (US)

(72) Inventors: Michael J. Gutensohn, Rodeo, CA (US); Siva Chandra Mouli Sivapurapu, Santa Clara, CA (US); Mark E. Drummond, Palo Alto, CA (US); Daniel L. Kovacs, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/880,262

(22) Filed: Aug. 3, 2022

(65) Prior Publication Data

US 2023/0162450 A1 May 25, 2023

Related U.S. Application Data

(63) Continuation of application No. PCT/US2021/018303, filed on Feb. 17, 2021.
(Continued)

(51) Int. Cl.
*G06T 19/00* (2011.01)
*G06F 3/01* (2006.01)
(Continued)

(52) U.S. Cl.
CPC .......... *G06T 19/006* (2013.01); *G06F 3/011* (2013.01); *G06F 3/017* (2013.01);
(Continued)

(58) Field of Classification Search
CPC ..... G06T 19/006; G06T 19/003; G06T 19/20; G06F 3/011; G06F 2210/12; G06F 3/04815; G06F 3/017
See application file for complete search history.

(56) References Cited

U.S. PATENT DOCUMENTS

2002/0188678 A1 12/2002 Edecker et al.
2012/0249741 A1\* 10/2012 Maciocci .............. G06T 19/006
348/51
(Continued)

FOREIGN PATENT DOCUMENTS

EP 3495921 A1 6/2019
WO 2014188393 A1 11/2014

OTHER PUBLICATIONS

PCT International Search Report and Written Opinion dated Jun. 7, 2021, International Application No. PCT.US2021/018303, pp. 1-11.

*Primary Examiner* — Jin Cheng Wang
(74) *Attorney, Agent, or Firm* — Fernando & Partners, LLP; Allen J. Oh

(57) ABSTRACT

Various implementations disclosed herein include a method performed by an electronic device including one or more processors and a non-transitory memory. The method includes obtaining first environmental data that characterizes a first physical setting that is spatially distinct from a second physical setting. The second physical setting includes the electronic device. The method includes generating, using the first environmental data, a first extended reality (XR) environment corresponding to the first physical setting. The method includes generating a first mapping between a first bounding surface of the second physical setting and a first bounding surface of the first XR environment.

15 Claims, 27 Drawing Sheets

Related U.S. Application Data

(60) Provisional application No. 62/982,249, filed on Feb. 27, 2020.

(51) Int. Cl.
  *G06F 3/04815* (2022.01)
  *G06T 19/20* (2011.01)

(52) U.S. Cl.
  CPC ........ *G06F 3/04815* (2013.01); *G06T 19/003* (2013.01); *G06T 19/20* (2013.01); *G06T 2210/12* (2013.01)

(56) References Cited

U.S. PATENT DOCUMENTS

| | | | |
|---|---|---|---|
| 2013/0335303 A1* | 12/2013 | Maciocci | G02B 27/017 345/8 |
| 2018/0314484 A1* | 11/2018 | Pahud | G06F 3/1423 |
| 2018/0321894 A1* | 11/2018 | Paulovich | G06F 3/1454 |
| 2019/0197785 A1* | 6/2019 | Tate-Gans | G06T 19/006 |
| 2019/0304196 A1* | 10/2019 | Driancourt | G06F 3/011 |
| 2020/0090407 A1* | 3/2020 | Miranda | G06T 19/006 |
| 2021/0227178 A1* | 7/2021 | Lyon | G06T 19/003 |
| 2021/0263585 A1* | 8/2021 | Botta | G02B 27/0172 |
| 2021/0304503 A1* | 9/2021 | Bastov | G06F 3/011 |

\* cited by examiner

CONNECTING SPATIALLY DISTINCT SETTINGS

CROSS-REFERENCE TO RELATED APPLICATIONS

This application is a continuation application of International App No. PCT/US2021/018303, filed on Feb. 17, 2021, which is entitled to the benefit of the filing date of U.S. Provisional Patent App. No. 62/982,249, filed on Feb. 27, 2020, both of which are hereby incorporated by reference in their entirety.

TECHNICAL FIELD

The present disclosure relates to spatially distinct physical settings, and, in particular, connecting the spatially distinct physical settings.

BACKGROUND

In augmented reality (AR) applications, a device may present virtual objects overlaid on a physical setting. In virtual reality (VR) applications, a device may present a virtual environment that is created from computer-generated graphics and that does not relay on physical elements from the physical setting where the device is located.

In some circumstances, the devices are located and thus operate in different physical settings. For example, a first device is located in a residential house whereas a second device is located in an office building). Accordingly, the first and second devices obtain different sensor data from the different operating environments in which they are respectively located. Previously available systems lack a mechanism for connecting the first and second operating environments, and thus a user in the first operating environment cannot experience (e.g., view or interact with) the second operating environment.

SUMMARY

In accordance with some implementations, a method is performed at an electronic device with one or more processors, a non-transitory memory, and a display device. The method includes presenting, via the display device, a virtual agent within a first physical setting. The first physical setting is characterized by a plurality of bounding surfaces. The method includes determining that the virtual agent, or a new location of the virtual agent, satisfies a spatial threshold with respect to a particular one of the plurality of bounding surfaces. The method includes in accordance with a determination that the particular one of the plurality of bounding surfaces is associated with a second physical setting that is spatially distinct from the first physical setting: ceasing to present a first portion of the virtual agent in association with the first physical setting, associating the virtual agent with the second physical setting, and transmitting, to a second device, an instruction to display at least a portion of the virtual agent within the second physical setting.

In accordance with some implementations, a method is performed at an electronic device with one or more processors and a non-transitory memory. The method includes obtaining first environmental data that characterizes a first physical setting that is spatially distinct from a second physical setting, wherein the second physical setting is associated with the electronic device. The method includes generating, from the first environmental data, a first extended reality (XR) environment corresponding to the first physical setting. The method includes generating a first mapping between a first bounding surface of the second physical setting and a first bounding surface of the first XR environment.

In accordance with some implementations, a method is performed at an electronic device with one or more processors, a non-transitory memory, one or more input devices, and a display device. The method includes obtaining a first extended reality (XR) environment corresponding to a first physical setting. The method includes displaying, via the display device, a portion of a second physical setting that is associated with the electronic device. The second physical setting is spatially distinct from the first physical setting. The method includes while displaying the portion of the second physical setting: receiving, via the one or more input devices, a request to navigate to the first XR environment, and, in response to receiving the request, replacing, via the display device, the portion of the second physical setting with a portion of the first XR environment. The request is directed to a bounding surface of the second physical setting.

In accordance with some implementations, an electronic device includes one or more processors, a non-transitory memory, optionally one or more input devices, and optionally a display device. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
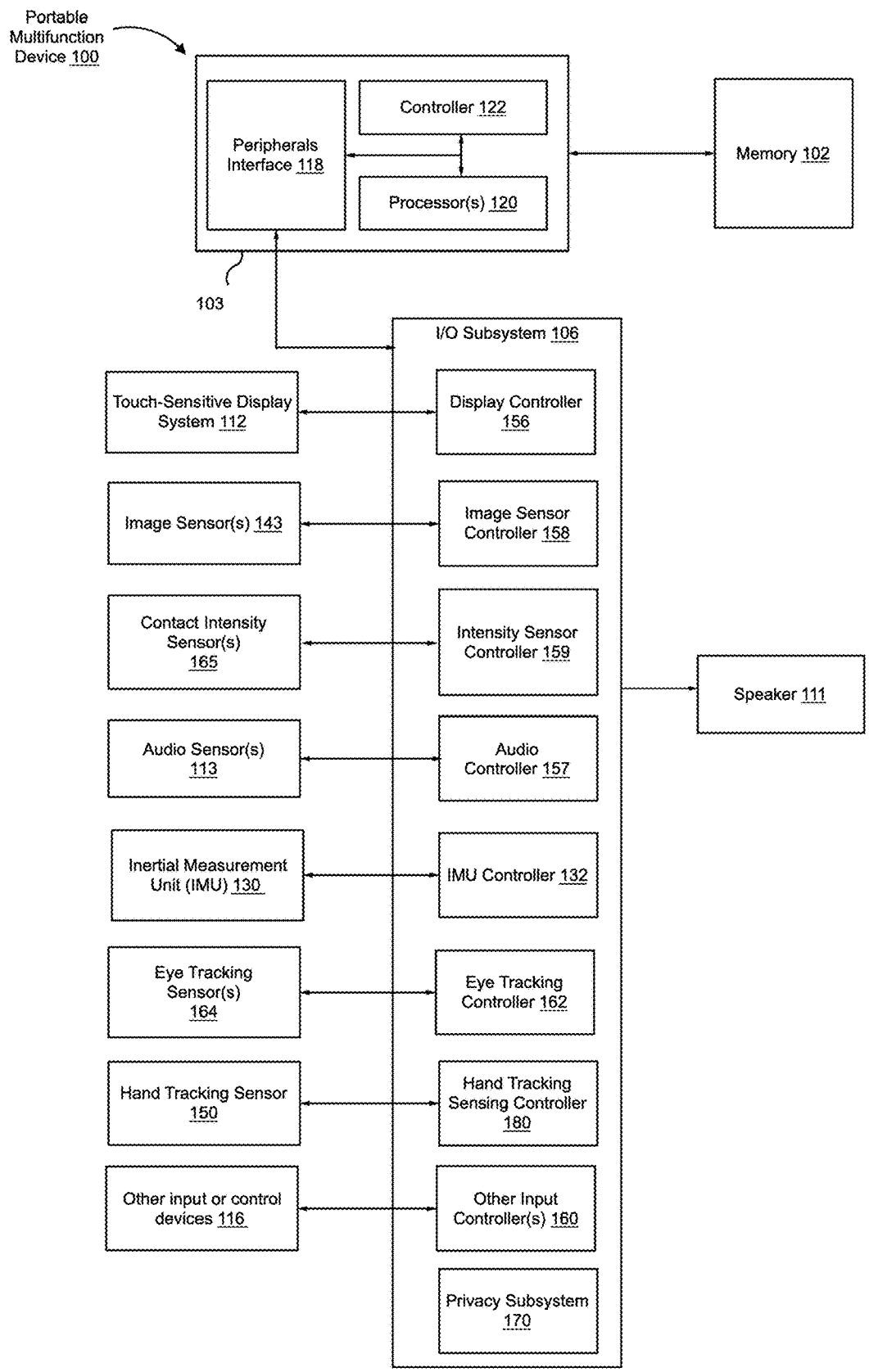
FIG. 1 is a block diagram of an example of a portable multifunction device in accordance with some implementations.

Some systems display content within an operating environment that is associated with a user, such as content within a field-of-view of a head-mountable device (HMD) being worn by the user. In some applications, the operating environment corresponds to a physical (e.g., real-world) environment including physical objects. In augmented reality (AR) applications, the operating environment includes virtual objects overlaid on the physical setting. In virtual reality (VR) applications, a user is presented with a virtual environment that may have no connection with the physical setting of the user. In some circumstances, HMDs are located in different operating environments. For example, a first HMD is located in a first operating environment (e.g., a room of a house), whereas a second HMD is located in a second operating environment (e.g., an office within a building) that is different from the first operating environment. Accordingly, the first and second HMDs obtain different sensor data because they are located in different operating environments. However, these systems lack a mechanism for connecting the first and second operating environments, and thus a user in the first operational environment cannot experience (e.g., view or interact with) the second operational environment.

By contrast, various implementations include an electronic device (e.g., a head-mountable device (HMD)) for generating a first extended reality (XR) environment based on a first physical setting, and generating a mapping between a first bounding surface of the second physical setting and a first bounding surface of the first XR environment. The first physical setting is spatially distinct from a second physical setting that is associated with the electronic device. In some implementations, the electronic device generates a mapping from a second bounding surface of the second physical setting to a virtual environment.

According to various implementations, an electronic device enables virtual navigation to a first XR environment based on an input directed to a bounding surface of the second physical setting. To that end, the electronic device generates the first XR environment corresponding to the first physical setting. The first physical setting is spatially distinct from a second physical setting that is associated with the electronic device. Based on an input directed to a bounding surface of the second physical setting, the electronic device changes the display from a portion of the second physical setting to a portion of the first XR environment. For example, in response to detecting an input touching a wall within the second physical setting, the electronic device replaces display of the wall with a portion of the first XR environment, such as a different room or an outdoor area (e.g., a park).

According to various implementations, an electronic device enables sharing a virtual agent across distinct physical settings. To that end, the electronic device displays the virtual agent within a first physical setting and determines that the virtual agent satisfies a spatial threshold with respect to a particular one of the plurality of bounding surfaces that characterizes the first physical setting. For example, the electronic device determines the virtual agent is less than a threshold distance away from a wall of a room that includes the electronic device. In some implementations, the electronic device determines that the particular one of the plurality of bounding surfaces is associated with a second physical setting that is spatially distinct from the first physical setting. Accordingly, the electronic device ceases to display a first portion of the virtual agent in association with the first physical setting, associated the virtual agent with the second physical setting, and transmits, to a second device, an instruction to display the virtual agent within the second physical setting.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, an electronic device comprises one or more processors working with non-transitory memory. In some implementations, the non-transitory memory stores one or more programs of executable instructions that are executed by the one or more processors. In some implementations, the executable instructions carry out the techniques and processes described herein. In some implementations, a computer (readable) storage medium has instructions that, when executed by one or more processors of an electronic device, cause the electronic device to perform, or cause performance, of any of the techniques and processes described herein. The computer (readable) storage medium is non-transitory. In some implementations, a device includes one or more processors, a non-transitory memory, and means for performing or causing performance of the techniques and processes described herein.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a touch-sensitive display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), a hand tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an image sensor controller 158, an intensity sensor controller 159, an audio controller 157, an eye tracking controller 162, one or more input controllers 160 for other input or control devices, an IMU controller 132, a hand tracking controller 180, and a privacy subsystem 170. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a physical setting.

The touch-sensitive display system 112 provides an input interface and an output interface between the electronic device 100 and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor, or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example implementation, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other implementations. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112.

The user optionally makes contact with the touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical setting. In some implementations, at least one contact intensity sensor 165 is collocated with, or proximate to, a touch-sensitive surface of the electronic device 100. In some implementations, at least one contact intensity sensor 165 is located on the back of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The hand tracking sensor 150 obtains hand tracking data indicative of a position of a hand of a user. For example, the electronic device 100 utilizes the hand tracking data in order to determine whether a user is contacting a bounding surface of a physical setting.

In various implementations, the electronic device 100 includes a privacy subsystem 170 that includes one or more privacy setting filters associated with user information, such as user information included in the eye gaze data and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically). As yet another example, the privacy system 170 denies access to a first individual having a first access level that does not satisfy an access level criterion that is associated with an XR session, and allows access to a second individual having a second access level that satisfies the access level criterion.

Figure 2:
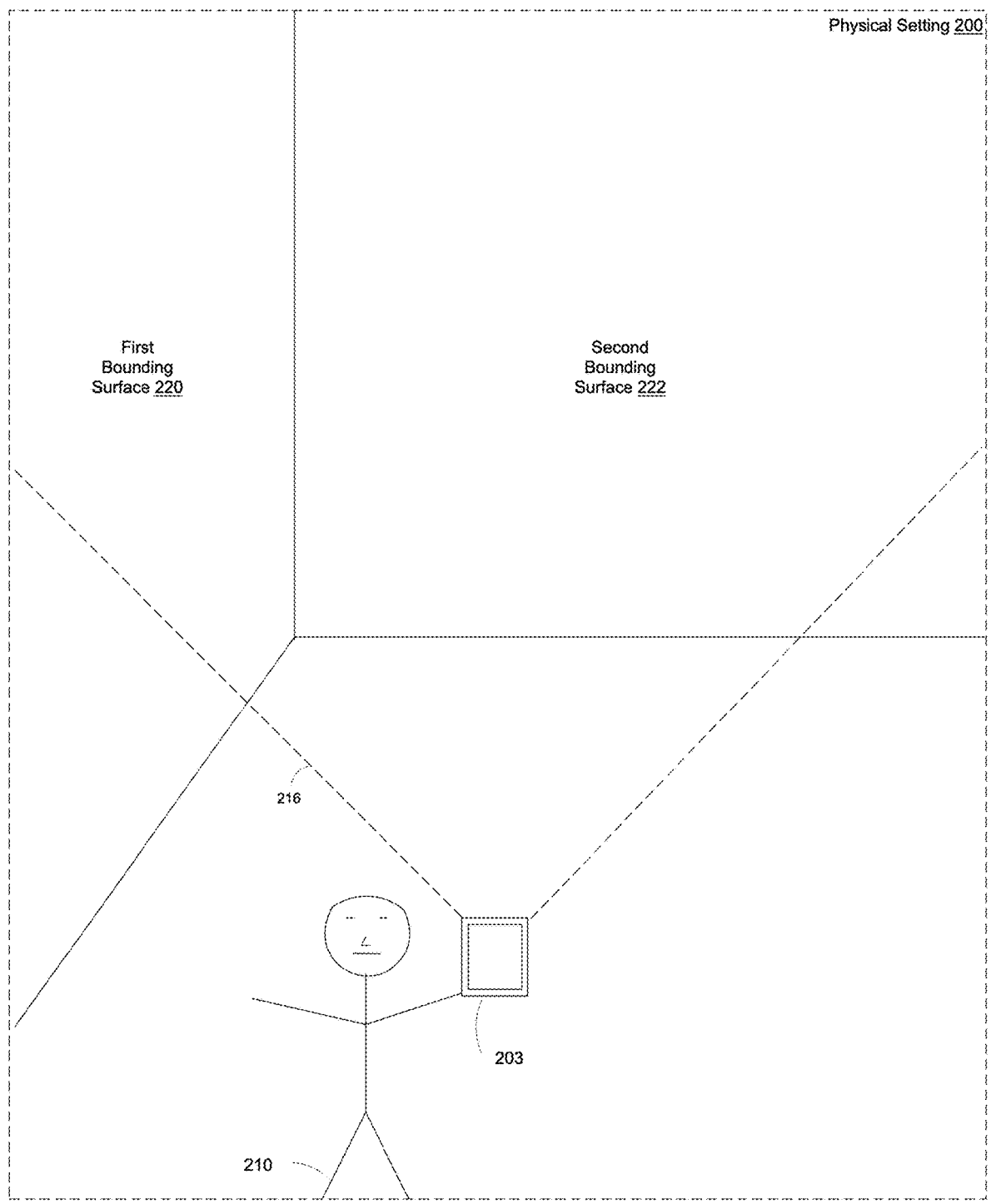
FIG. 2 is an example of a physical setting in accordance with some implementations.

FIG. 2 is an example of a physical setting 200 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

The physical setting 200 includes a number of physical bounding surfaces. For example, as illustrated in FIG. 2, the physical setting 200 includes a first bounding surface 220 and a second bounding surface 222. As an example, the first bounding surface 220 and the second bounding surface 222 respectively correspond to a first and second wall of the physical setting 200. One of ordinary skill in the art will appreciate that the physical setting 200 may include any number of bounding surfaces, such as three of four walls, a floor, a ceiling, or a combination thereof. Moreover, the physical setting 200 includes an electronic device 203, which is being held by a user 210. In some implementations, the electronic device 203 corresponds to a mobile device, such as a smartphone, laptop, tablet, etc. In some implementations, the electronic device 203 is similar to and adapted from the electronic device 100 in FIG. 1. The electronic device 203 is associated with a field-of-view 216. For example, the electronic device 203 includes an image sensor (e.g., a camera) that capture a portion of the physical setting 200, and the portion is defined by the current field-of-view 216 of the image sensor. According to various implementations, the electronic device 203 may perform a number of spatial connection operations between (e.g., a bounding surface of) the physical setting 200 and one or more extended reality (XR) environments, such as is described with reference to FIGS. 3A-3F, 4, 5A-5C, and 6A-6M.

FIGS. 3A-3F are an example of sharing a virtual agent across distinct physical settings in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

Figure 3A:
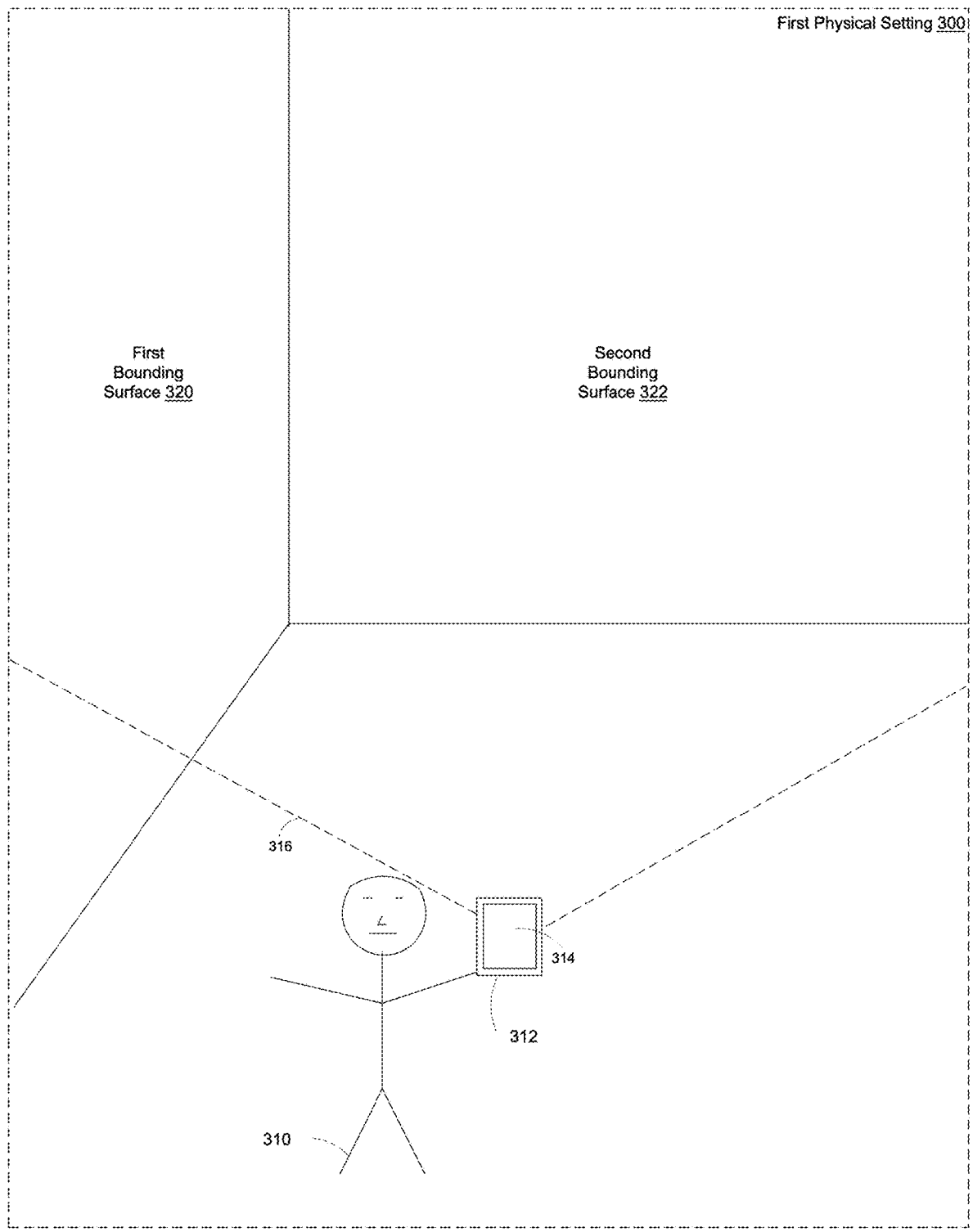
FIGS. 3A-3F are an example of sharing a virtual agent across distinct physical settings in accordance with some implementations.

To that end, as illustrated in FIG. 3A, a first physical setting 300 includes a first bounding surface 320, a second bounding surface 322, and a user 310 holding an electronic device 312 that includes a display device 314. The electronic device 312 is associated with a field-of-view 316 that includes a portion of the first physical setting 300.

In some implementations, the electronic device 312 corresponds to a head-mountable device (HMD) including an integrated display (e.g., a built-in display) that displays an XR environment, such as an augmented reality (AR) environment. In some implementations, the electronic device 312 includes a head-mountable enclosure. In various implementations, the head-mountable enclosure includes an attachment region to which another device with a display can be attached. In various implementations, the head-mountable enclosure is shaped to form a receptacle for receiving another device that includes a display. For example, in some implementations, the electronic device 312 slides/snaps into or otherwise attaches to the head-mountable enclosure. In some implementations, the display of the device attached to the head-mountable enclosure presents (e.g., displays) the XR environment. For example, in some implementations, the electronic device 312 corresponds to a mobile phone that can be attached to the head-mountable enclosure. In various implementations, examples of the electronic device 312 include smartphones, tablets, media players, laptops, etc.

Figure 3B:
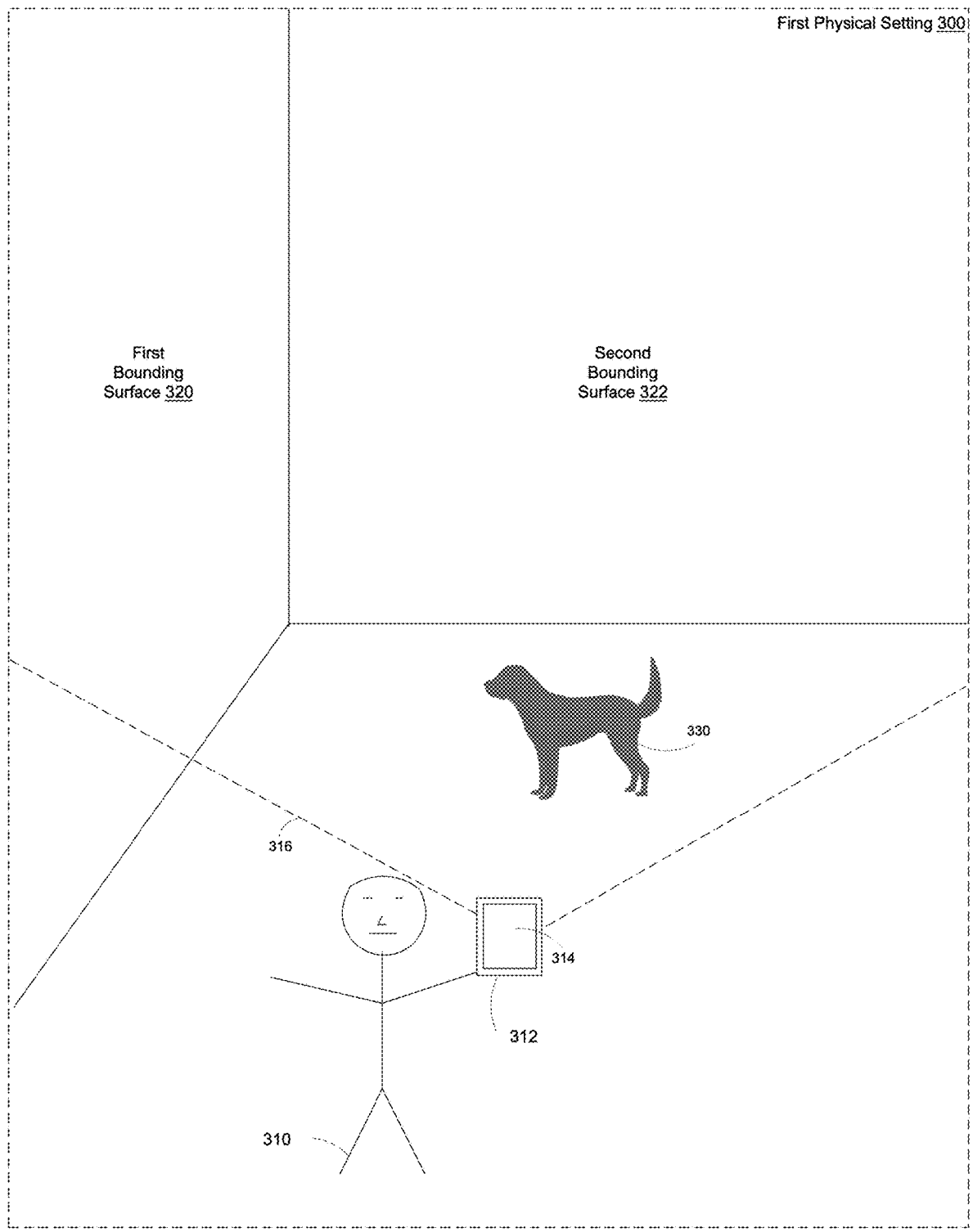

As illustrated in FIG. 3B, the electronic device 312 displays, via the display device 314, a virtual dog 330. In some implementations, the virtual dog 330 is included within an XR environment that the electronic device 312 obtains or generates. The virtual dog 330 is facing the first bounding surface 320 of the first physical setting 300. One of ordinary skill in the art will appreciate that, in some implementations, numerous virtual agents are displayed within a particular XR environment.

In various implementations, a virtual agent is configured to performs an action in order to satisfy (e.g., complete or achieve) an objective of the virtual agent. For example, the virtual agent is configured to move a virtual object within an XR environment, such as moving a virtual stapler across a physical table or a virtual table. In some implementations, the virtual agent obtains the objective from a human operator (e.g., a user of a device). In some implementations, the virtual agent obtains the objective from an XR representation of the human operator.

Figure 3C:
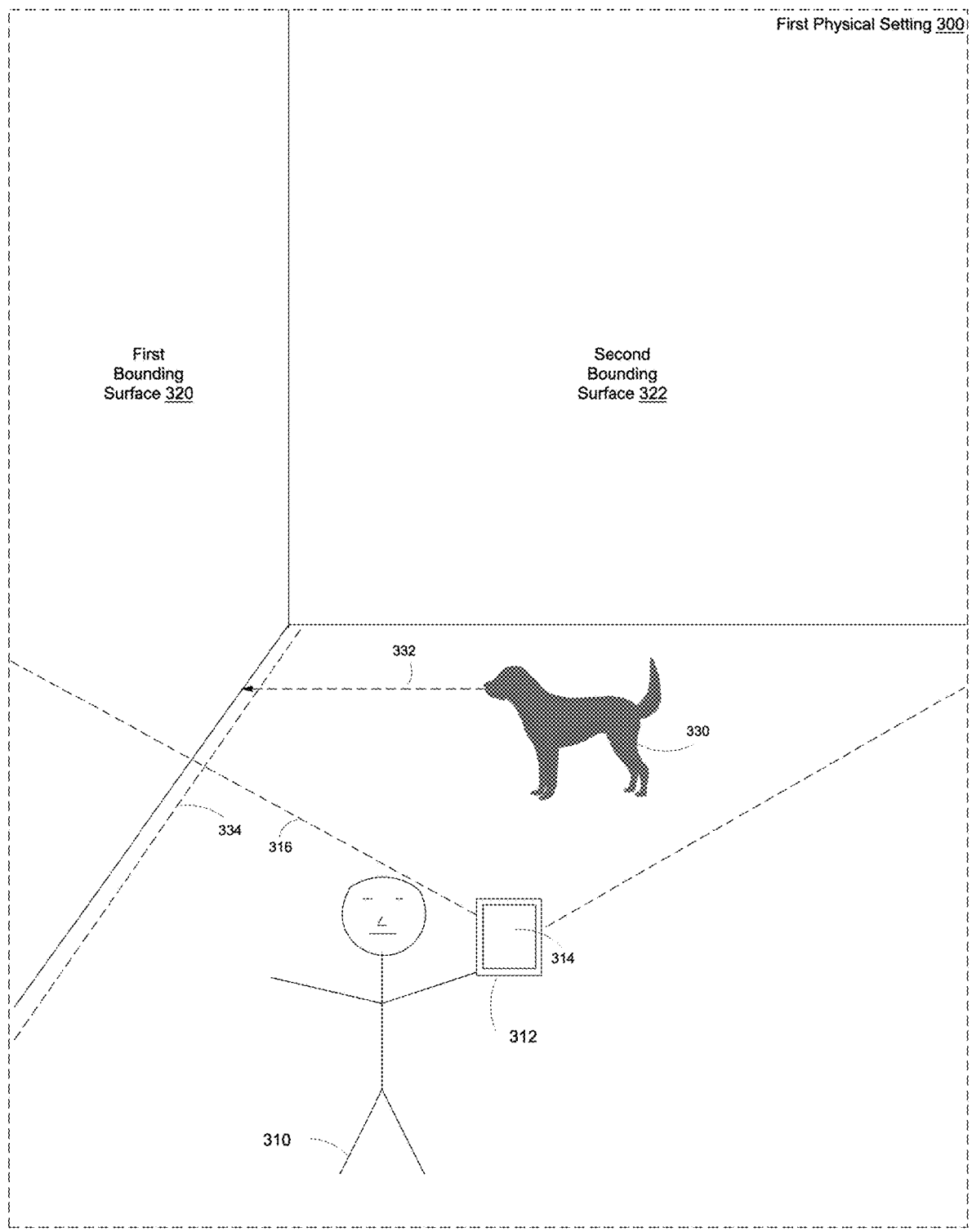

As illustrated in FIG. 3C, the electronic device 312 begins to change the position of the virtual dog 330 towards the first bounding surface 320, as is indicated by movement line 332, which is illustrated for purely explanatory purposes. The movement line 332 is illustrated in order to indicate that the virtual dog 330 is walking towards the first bounding surface 320. As further illustrated in FIG. 3C, a spatial threshold line 334 is illustrated (for purely explanatory purposes), which will be described below.

Figure 3D:
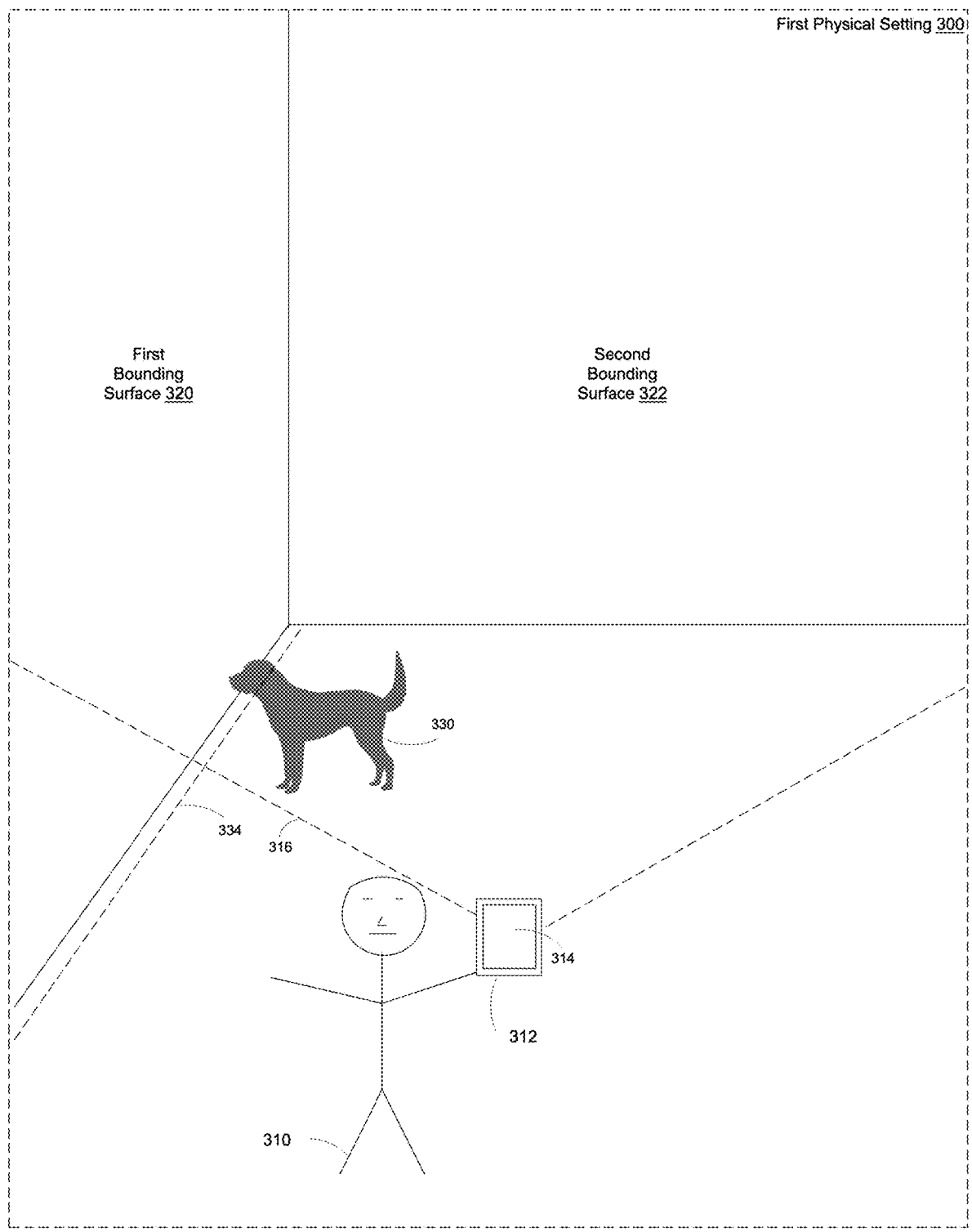

As illustrated in FIG. 3D, the electronic device 312 moves the virtual dog 330 leftwards towards the first bounding surface 320. Notably, the virtual dog 330 satisfies a spatial threshold because the virtual dog 330 has crossed the spatial threshold line 334.

Figure 3E:
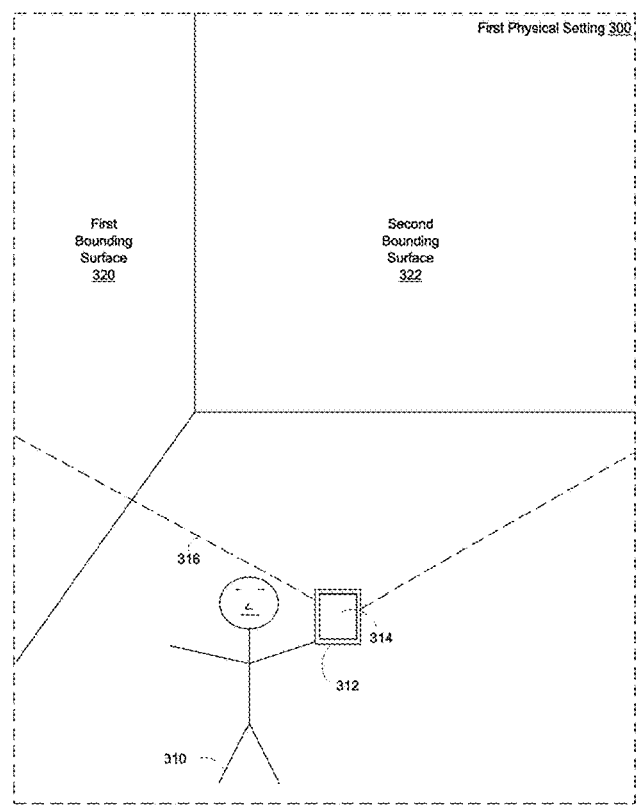
Figure 3E:
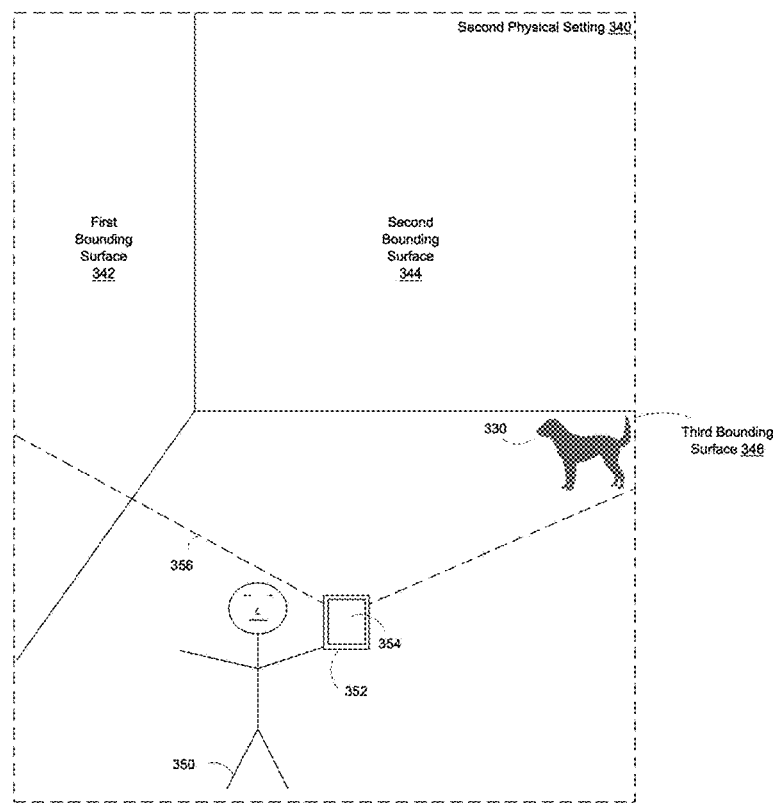

In response to determining that the virtual dog 330 satisfies the spatial threshold in FIG. 3D, the electronic device 312 ceases to display the virtual dog 330, as illustrated in FIG. 3E. Moreover, the electronic device 312 associates the virtual dog 330 with a second physical setting 340, and transmits, to a second device 352 being held by an individual 350, an instruction to display the virtual agent within the second physical setting 340. The second physical setting 340 is distinct from the first physical setting 300, and includes a number of bounding surfaces including a first bounding surface 342, a second bounding surface 344, a third bounding surface 346, etc. The second device 352 is associated with a field-of-view 356 including a portion of the second physical setting 340.

In some implementations, as illustrated in FIG. 3E, in response to receiving the instruction from the electronic device 312, the second device 352 displays, on a display device 354, the virtual dog 330. For example, the second device 352 displays an XR environment including the virtual dog 330 positioned within the XR environment so as to appear from the third bounding surface 346 of the second physical setting 340. In this way, the virtual dog 330 is shared between the first physical setting 300 and the second physical setting 340. In other words, the electronic device 312 shares the virtual dog 330 with the second physical setting 340.

Figure 3F:
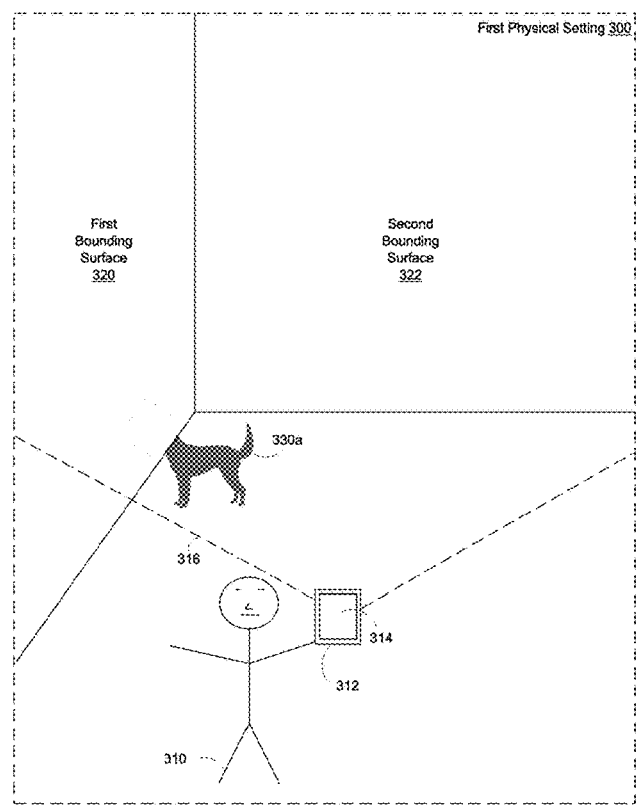
Figure 3F:
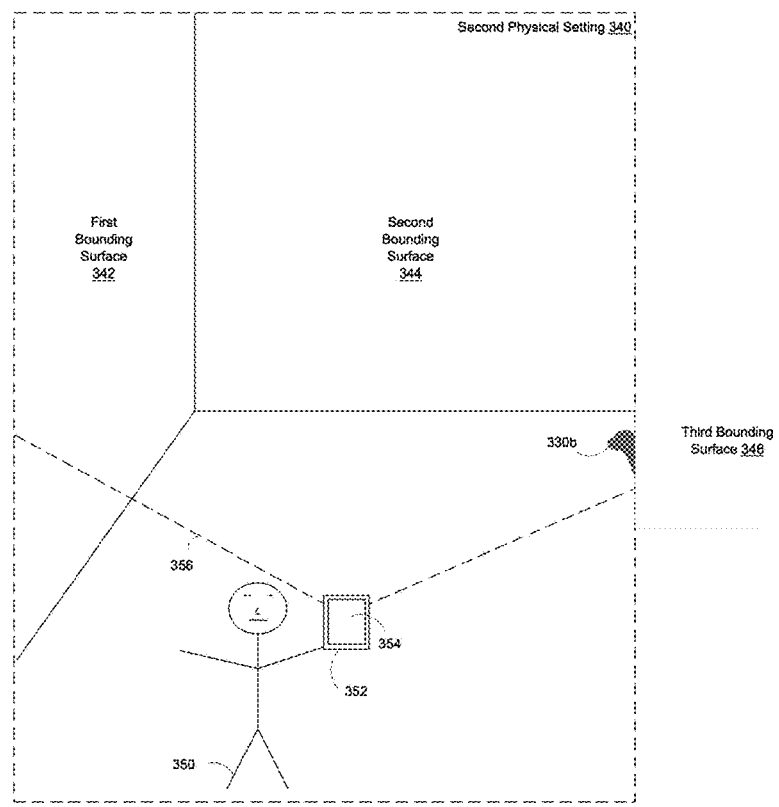

In some implementations, as illustrated in FIG. 3F, in response to determining that the virtual dog 330 satisfies the spatial threshold in FIG. 3D, the electronic device 312 maintains display of a first portion 330a (e.g., the neck, body, legs, and tail) of the virtual dog 330. Moreover, the electronic device 312 transmits an instruction to the second device 352 to display a second portion 330b (e.g., the head) of the virtual dog 330. As further illustrated in FIG. 3F, in some implementations, the second device 352 displays the second portion 330b of the virtual dog 330.

Figure 4:
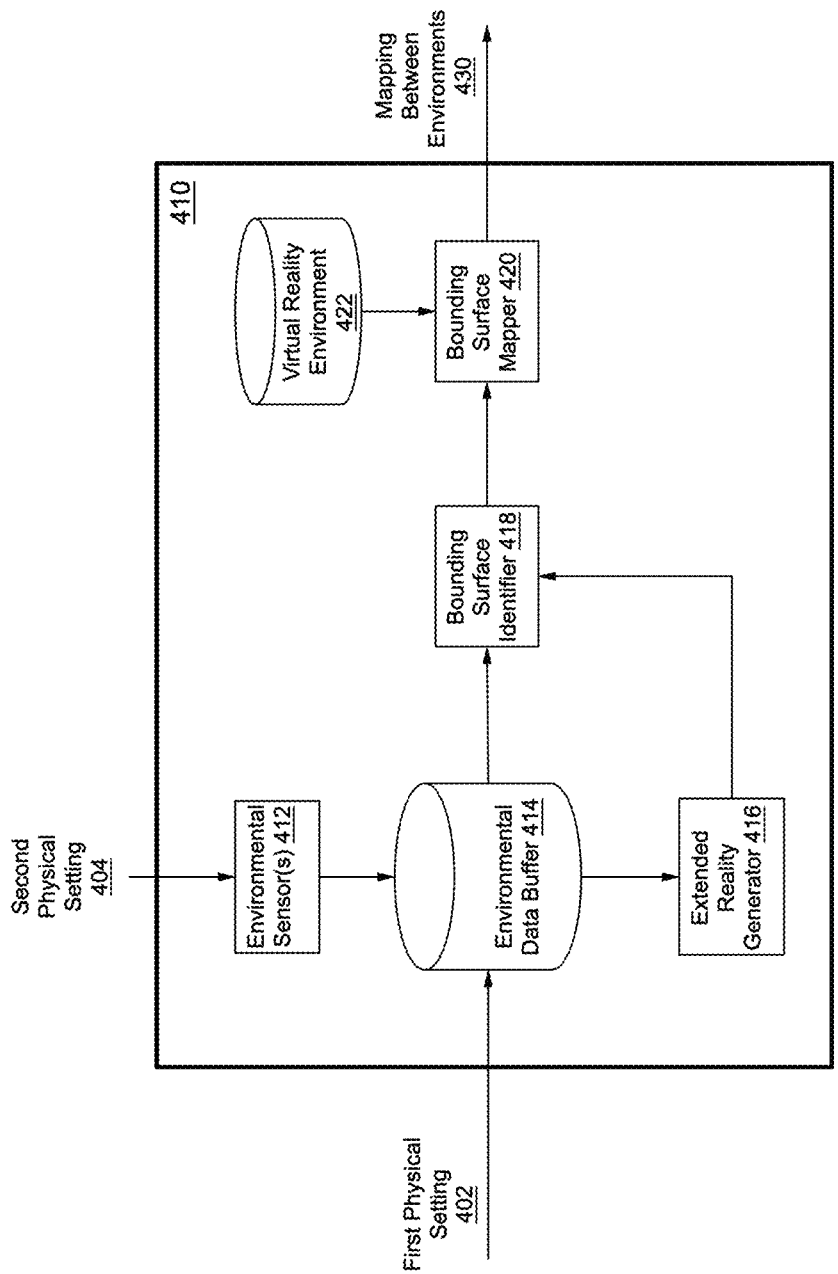
FIG. 4 is an example of a block diagram of a system for mapping a physical setting to an extended reality (XR) environment in accordance with some implementations.

FIG. 4 is an example of a block diagram of a system 410 for mapping a physical setting to an XR environment in accordance with some implementations. In some implementations, the system or components thereof are implemented by the electronic device 100 in FIG. 1, the electronic device 312 in FIGS. 3A-3F, or the electronic device 652 in FIGS. 6A-6M.

As illustrated in FIG. 4, the system 410 obtains first environmental data that characterizes a first physical setting 402. In some implementations, the system 410 buffers the first environmental data in environmental data buffer 414. In some implementations, the system 410 obtains second environmental data that characterizes a second physical setting 404, such as a physical setting in which an operating HMD currently exists. The first physical setting 402 is spatially distinct from the second physical setting 404. In some implementations, the system 410 includes environmental sensors 412 (e.g., image sensor, depth sensor, time-of-flight sensor) for obtaining the second environmental data. In some implementations, the system 410 buffers the second environmental data in the environmental data buffer 414.

The system 410 includes an extended reality generator 416 for generating an XR environment from the first environmental data, and optionally from the second environmental data. The XR environment corresponds to the first physical setting 402. For example, the first physical setting 402 includes a physical table, and thus the extended reality generator 416 generates the XR environment including a virtual table that corresponds to the physical table.

In some implementations, the system 410 includes a bounding surface identifier 418 that identifies a first bounding surface of the first physical setting 402. For example, the bounding surface identifier 418 utilizes scene identification (e.g., instance segmentations and/or semantic segmentation) in order to identify a wall or a floor within image data that characterizes the first physical setting 402.

In some implementations, the system 410 generates a virtual reality (VR) environment or obtains (e.g., from the virtual reality (VR) environment datastore 422) the VR environment, and utilizes the VR environment in mapping distinct physical settings to each other. For example, will reference to FIG. 5C, in some implementations, the system 410 maps a second XR environment 524 (associated with a second physical setting 520) to a third XR environment 544 (associated with a third physical setting 540) via a second VR environment 532.

The system 410 includes a bounding surface mapper 420 that generates a mapping between a first bounding surface of the second physical setting 404 and a first bounding surface of the first XR environment 402. The system 410 may output the mapping via output 430.

Figure 5A:
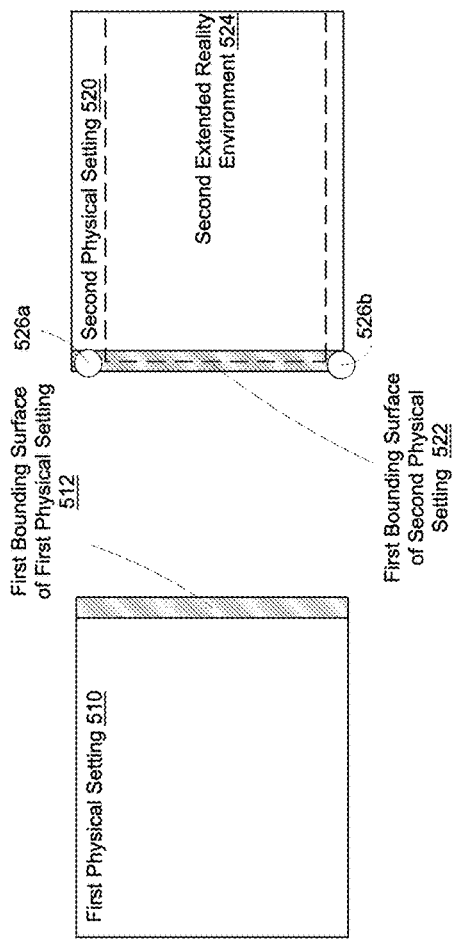
FIGS. 5A-5C are examples of mapping physical settings to each other in accordance with some implementations.
Figure 5B:
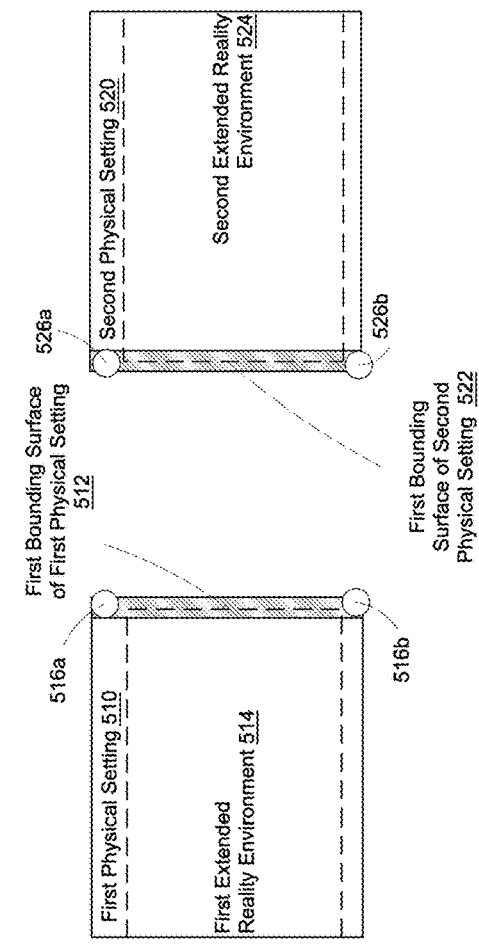
Figure 5C:
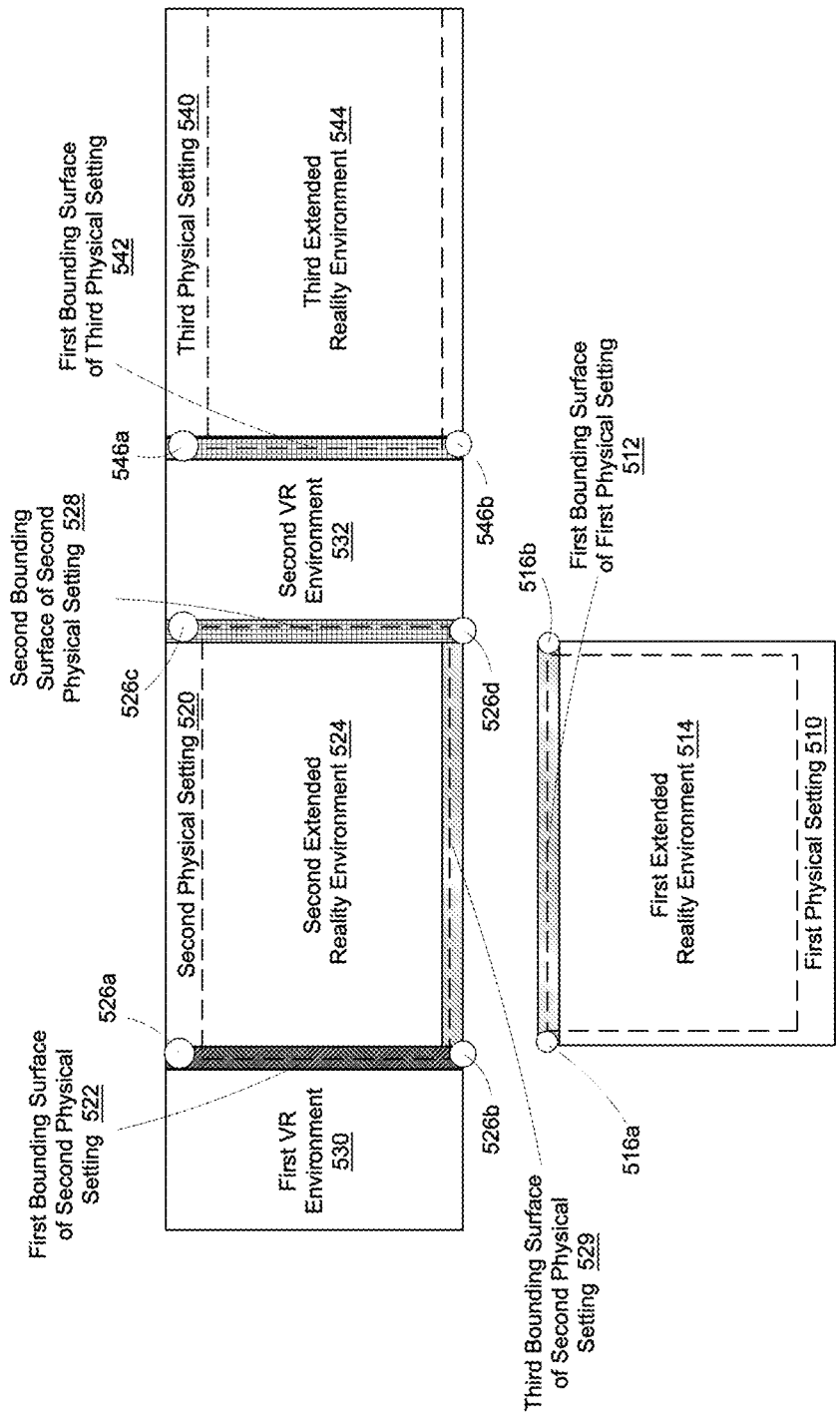

FIGS. 5A-5C are examples of mapping physical settings to each other in accordance with some implementations. In some implementations, the mapping or portions thereof are performed by the electronic device 100 in FIG. 1 or by the system 410 in FIG. 4.

As illustrated in FIG. 5A, a first physical setting 510 is spatially distinct from a second physical setting 520. The first physical setting 510 includes a first bounding surface 512, whereas the second physical setting 520 includes a first bounding surface 522. According to various implementations, an electronic device associated with (e.g., included in) the second physical setting 520 generates a second XR environment 524 corresponding to the second physical setting 520. The second XR environment 524 includes a first bounding surface that corresponds to the first bounding surface 522 of the second physical setting 520. According to various implementations, the electronic device maps the first bounding surface of the second XR environment 524 to the first bounding surface 512 of the first physical setting 510.

According to various implementations, electronic devices that are physically located in the same physical setting are associated with each other. For example, with reference to FIG. 5A, a first electronic device located in the first physical setting 510 detects a second electronic device also located in the first physical setting 510. In response to detecting the second electronic device in the first physical setting 510, the first electronic device associates the first electronic device with the second electronic device or sends a request to the second electronic device to associate the second electronic device with the first electronic device.

According to various implementations, electronic devices that are located in physically distinct (e.g., remote) physical setting are associated with each other. For example, with reference to FIG. 5A, a first electronic device located in the first physical setting 510 detects a second electronic device located in the second physical setting 520. In response to detecting the second electronic device in the second physical setting 520, the first electronic device associates the first electronic device with the second electronic device or sends a request to the second electronic device to associate the second electronic device with the first electronic device.

In some implementations, a first portion 526a and a second portion 526b of the second XR environment 524 are not mapped to the first bounding surface 512 of the first physical setting 510. For example, the first portion 526a and the second portion 526b of the second XR environment 524 respectively correspond to a first corner and a second corner of a room of the second physical setting 520. Continuing with the example, the first portion 526a and the second portion 526b are not mapped to the first bounding surface 512 of the first physical setting 510 in order to avoid ambiguity as to which bounding surface of the second physical setting 520 is being selected by an input directed to one of the two corners of the room.

Similar to FIG. 5A, FIG. 5B illustrates the first physical setting 510 and the second physical setting 520. However, an electronic device also generates a first XR environment 514 that corresponds to the first physical setting 510. Based on the first XR environment 514 and the second XR environment 524, the electronic device may map a first bounding surface of the second XR environment 524 to a first bounding surface 512 of the first XR environment 514. For example, the first XR environment 514 corresponds to a home office including a second device and the second XR environment 524 corresponds to a remote conference room including the electronic device. Continuing with the example, the electronic device generates a map between a bounding surface of the home office (within the first XR environment 514) and a bounding surface of the remote conference room (within the second XR environment 524). In some implementations, a first portion 516a (e.g., a first corner) and a second portion 516b (e.g., a second corner) of the first XR environment 514 are not mapped to the first bounding surface 522 of the second physical setting 520 in order to avoid ambiguity as to which bounding surface is being selected.

As illustrated in FIG. 5C, various implementations include mapping between physical settings through virtual reality environments (VRs). For example, a second XR environment 524 is mapped to a first VR environment 530 and to a second VR environment 532. The second VR environment 532 connects a second bounding surface 528 of the second XR environment 524 to a first bounding surface 542 of a third XR environment 544, as is indicated by a common hatching pattern of the second bounding surface 528 and the first bounding surface 542. Moreover, a third bounding surface 529 of the second XR environment 524 is mapped to a first bounding surface 512 of the first XR environment 514, as is indicated by a common hatching pattern of the third bounding surface 529 and the first bounding surface 512. One of ordinary skill in the art will appreciate that any number of VR environments may be provided (e.g., generated or obtained) in order to connect physical settings to each other.

As one example, the second VR environment 532 corresponds to a common meeting place, such as a restaurant. A first device within the second physical setting 520 may navigate to the second VR environment 532 by interacting with the second bounding surface 528, such as by a user of the first device pressing on a physical wall that corresponds to the second bounding surface 528. In this example, the first device includes an extremity sensor, such as a hand tracking sensor. Moreover, a second device within the third physical setting 540 may navigate to the second VR environment 532 by interacting with the first bounding surface 542, such as by a user of the second device focusing his or her gaze on the first bounding surface 542 for a threshold amount of time. In this example, the second device includes an eye tracking sensor.

In some implementations, a third portion 526c (e.g., a third corner) and a fourth portion 526d (e.g., a fourth corner) of the second XR environment 524 are not mapped to the second virtual environment 532 in order to avoid ambiguity as to which bounding surface is being selected. In some implementations, a first portion 546a (e.g., a first corner) and a second portion 546b (e.g., a second corner) of the third XR environment 544 are not mapped to the second virtual environment 532 in order to avoid ambiguity as to which bounding surface is being selected.

Figure 6A:
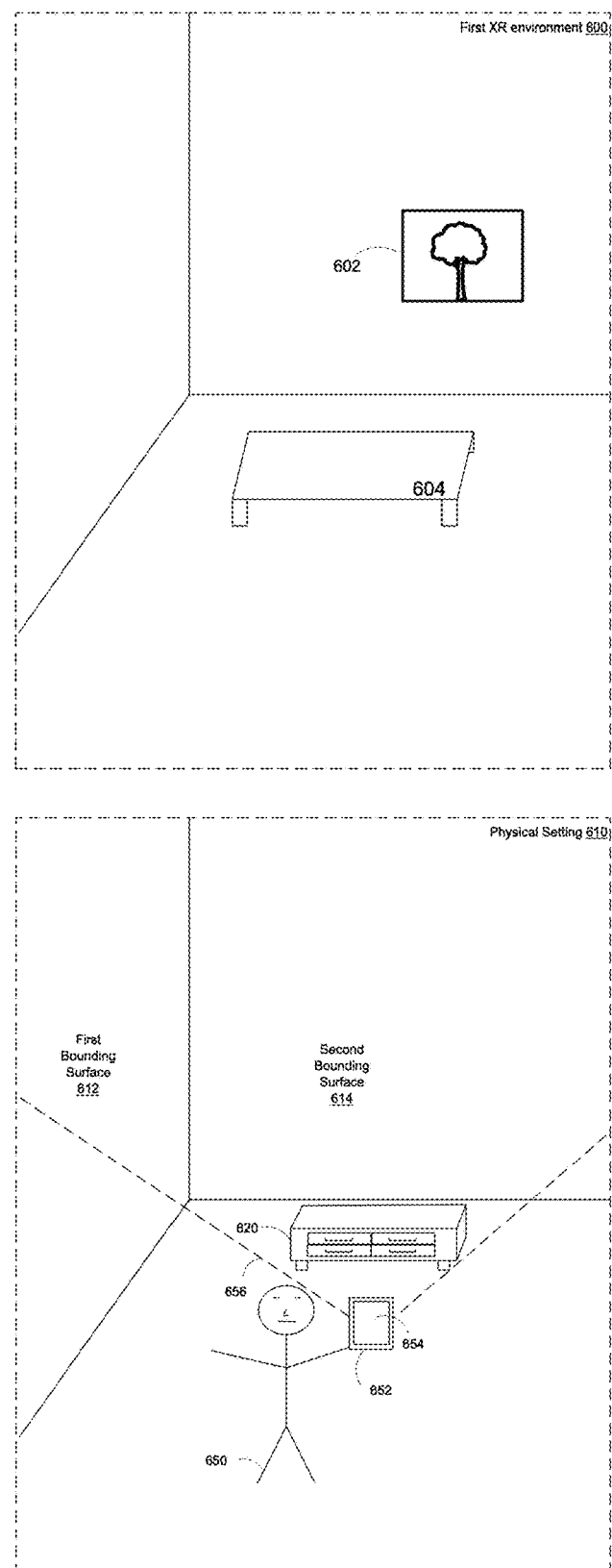
FIGS. 6A-6M are examples of enabling virtual navigation to various XR environments in accordance with some implementations.

FIGS. 6A-6M are examples of enabling virtual navigation to various XR environments in accordance with some implementations. As illustrated in FIG. 6A, a first XR environment 600 includes an XR painting 602 and an XR table 604. The first XR environment 600 corresponds to a respective physical setting. For example, the respective physical setting is a living room that includes a physical table corresponding to the XR table 604, wherein the XR painting 602 is a virtual painting because the living room does not include a physical painting.

As further illustrated in FIG. 6A, a physical setting 610 includes a physical credenza 620 and a user 650 holding an electronic device 652 that includes a display device 654. The electronic device 652 is associated with a field-of-view 656 that includes a portion of the physical setting 610 that includes the physical credenza 620. Accordingly, the display device 654 displays, to the user 650, the physical credenza 620.

The physical setting 610 is spatially distinct from the respective physical setting corresponding to the first XR environment 600. The physical setting 610 includes a first bounding surface 612, a second bounding surface 614, and may include other bounding surfaces. As illustrated in FIG. 6A, the user 650 is facing the second bounding surface 614.

Figure 6B:
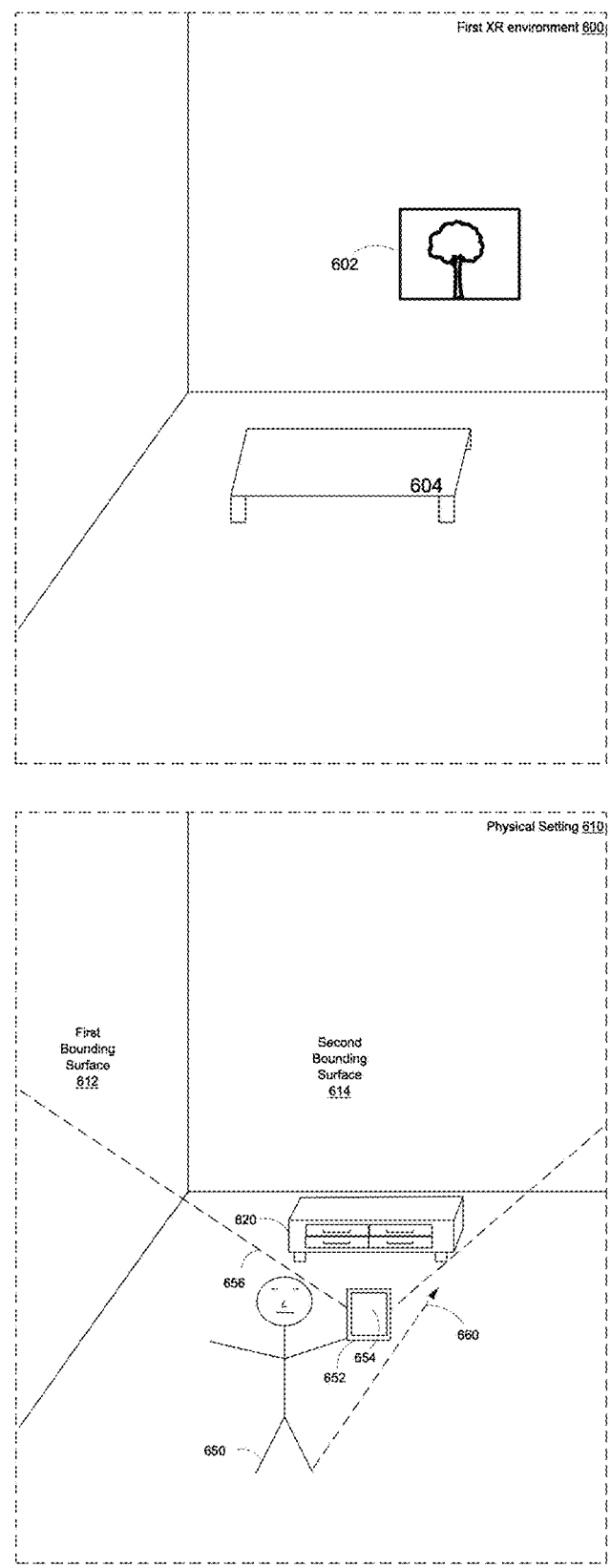
Figure 6C:
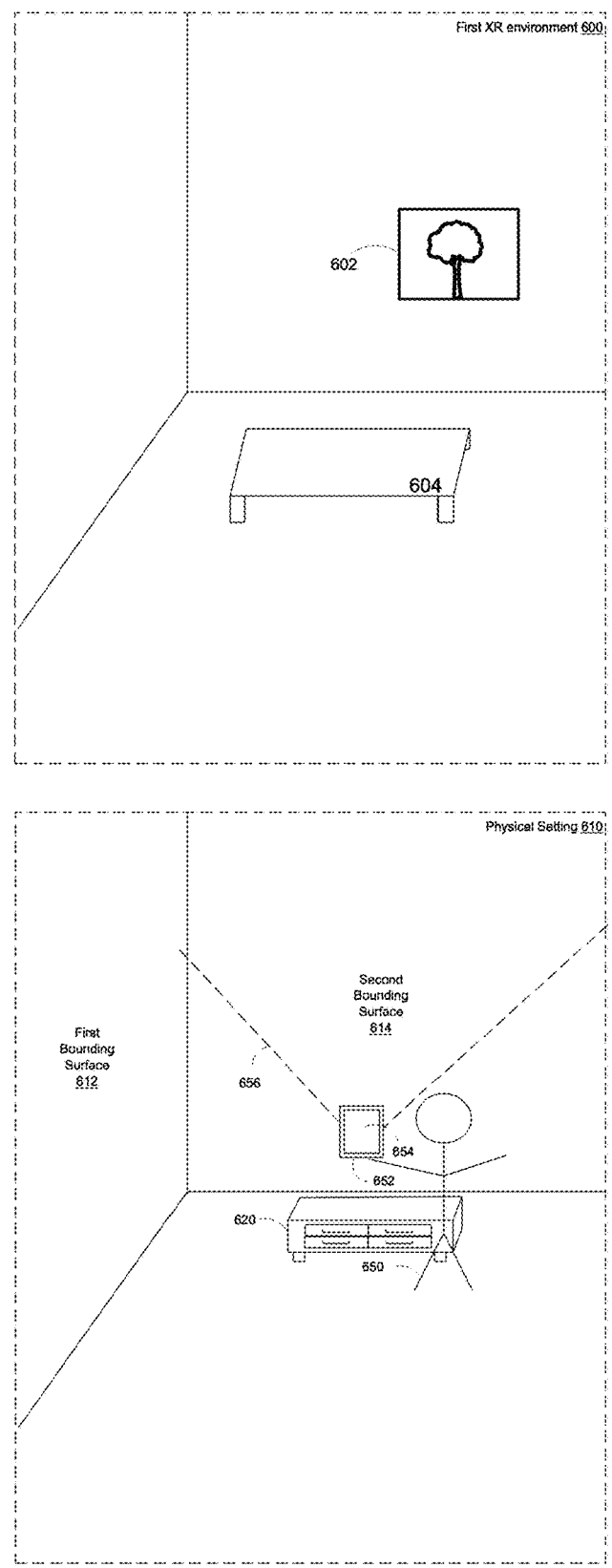

As illustrated in FIG. 6B, the user 650 begins walking towards the second bounding surface 614, as is indicated by a movement line 660, which is illustrated for purely explanatory purposes. As illustrated in FIG. 6C, the user 650 has reached the second bounding surface 614, and is facing the second bounding surface 614.

Figure 6D:
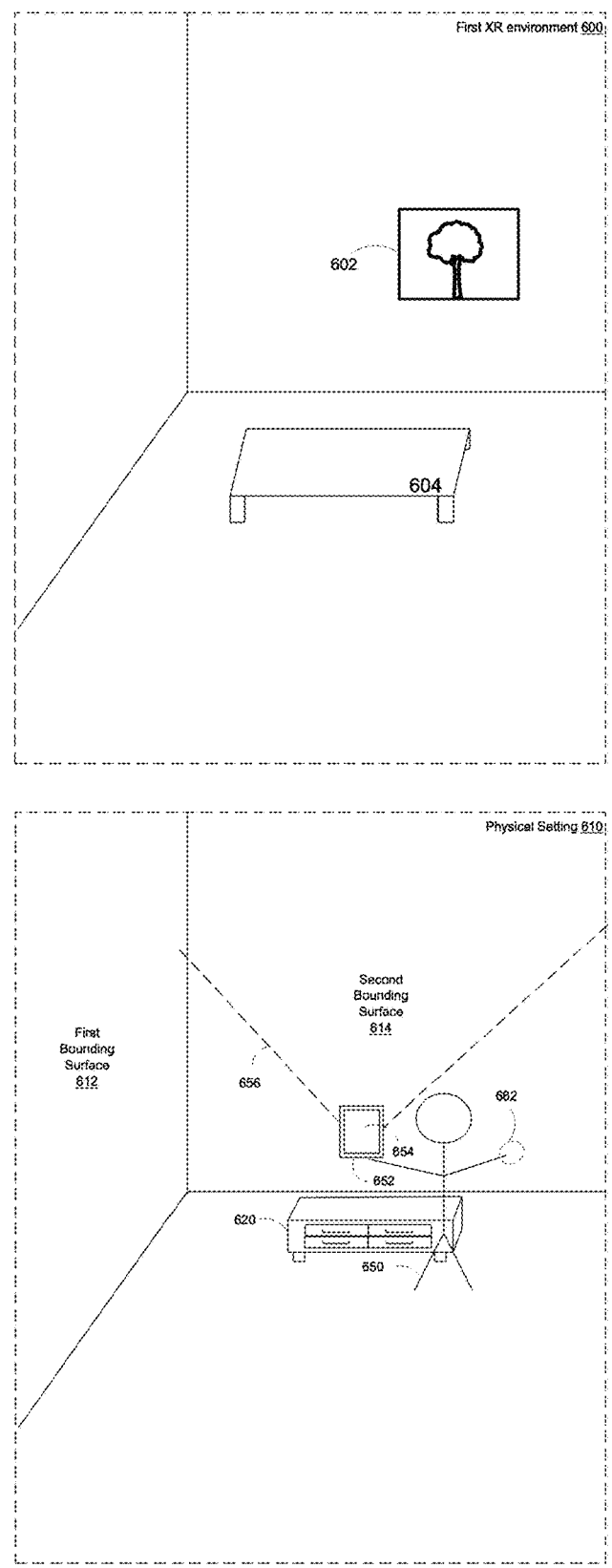

The electronic device 652 receives a request to navigate to the first XR environment 600, wherein the request is directed to the second bounding surface 614. For example, as illustrated in FIG. 6D, the electronic device 652 detects a touch 662 that is directed to the second bounding surface 614 or to a virtual affordance displayed overlaid on the second bounding surface 614. For example, the electronic device 652 includes an image sensor and an extremity tracking sensor (e.g., a hand tracking sensor), and determines that a hand of the user 650 contacts or is proximate to the second bounding surface 614 based on respective data from the image sensor and respective data from the extremity tracking sensor.

Figure 6E:
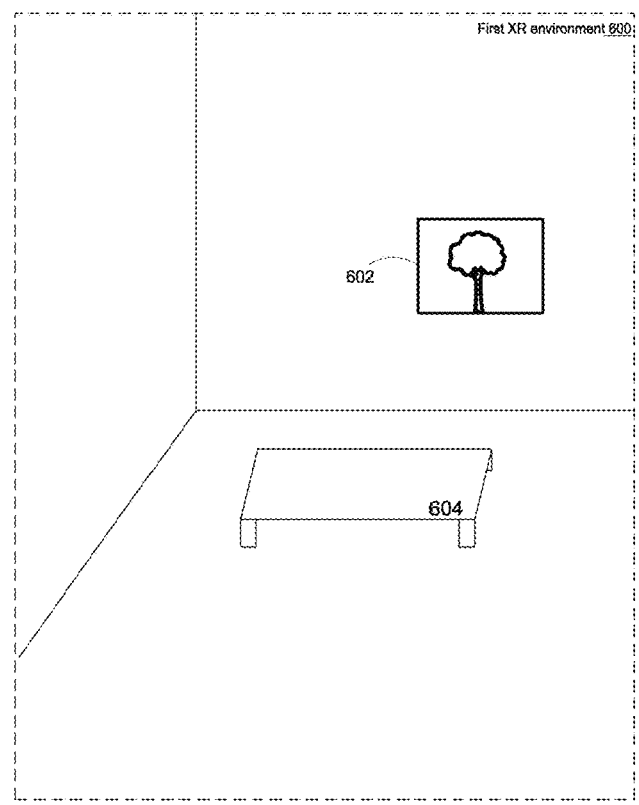
Figure 6E:
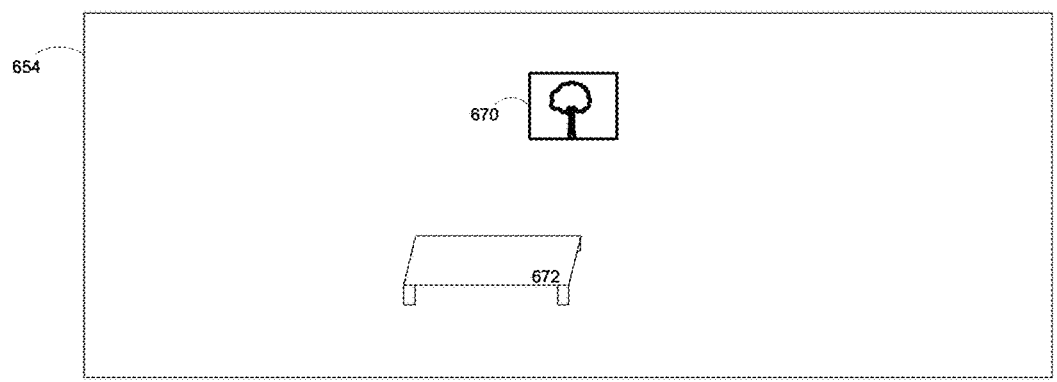

In some implementations, in response to receiving the request to navigate to the first XR environment 600 in FIG. 6D, the electronic device 652 determines that the electronic device 652 satisfies a navigation condition with respect to the first XR environment 600. For example, in some implementations, the electronic device 652 satisfies the navigation condition when a currently operating user profile associated with the user 650 satisfies an access level condition. In response to determining that the electronic device 652 satisfies the navigation condition, the electronic device 652 replaces, via the display device 654, the portion of the physical setting 610, including the physical credenza 620, with a portion of the first XR environment 600. Namely, as illustrated in FIG. 6E, the display device 654 ceases to display the physical credenza 620 and displays a portion of the first XR environment 600. The portion of the XR environment 600 includes a representation 670 of the XR painting 602 and a representation 672 of the XR table 604.

Figure 6F:
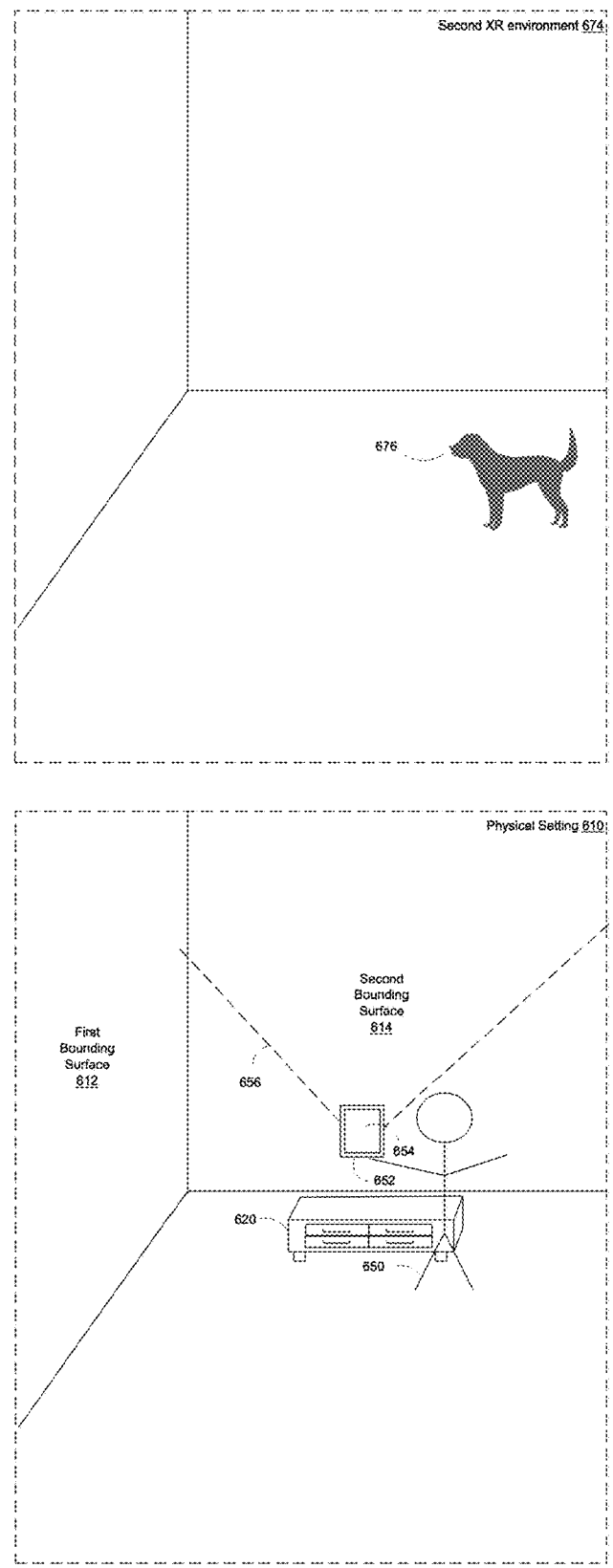
Figure 6G:
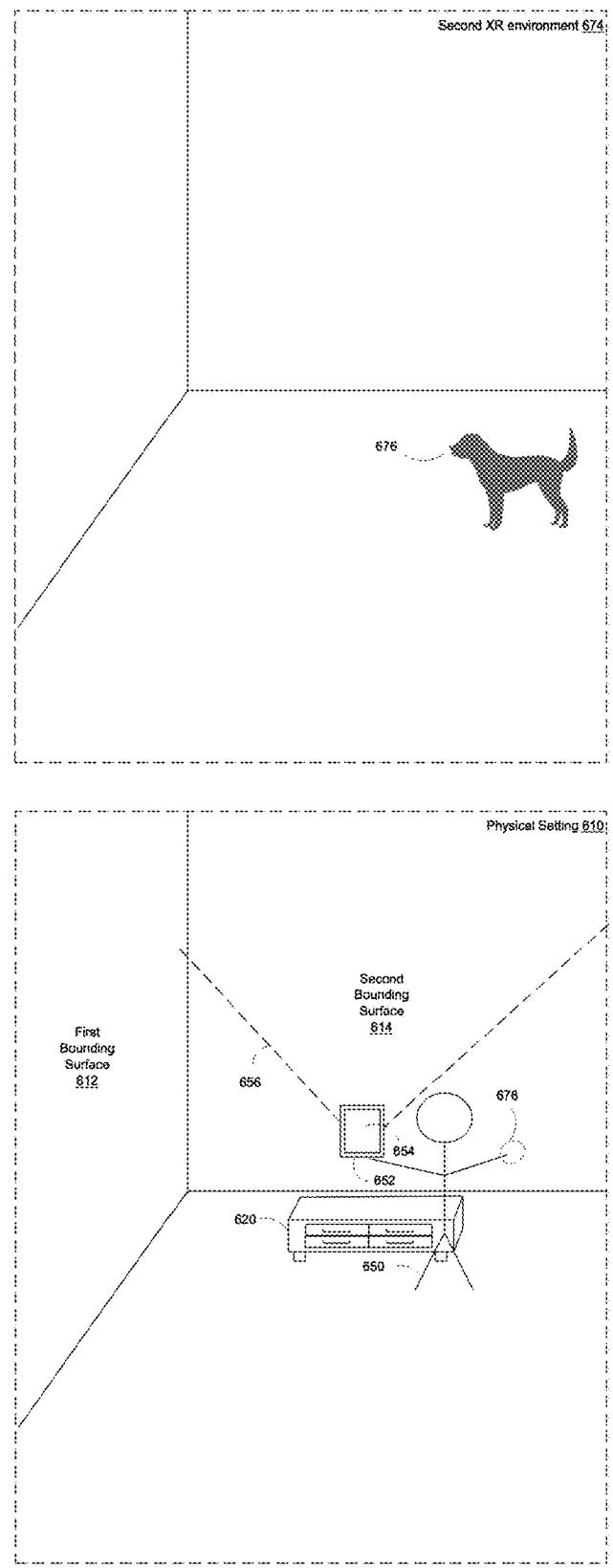
Figure 6H:
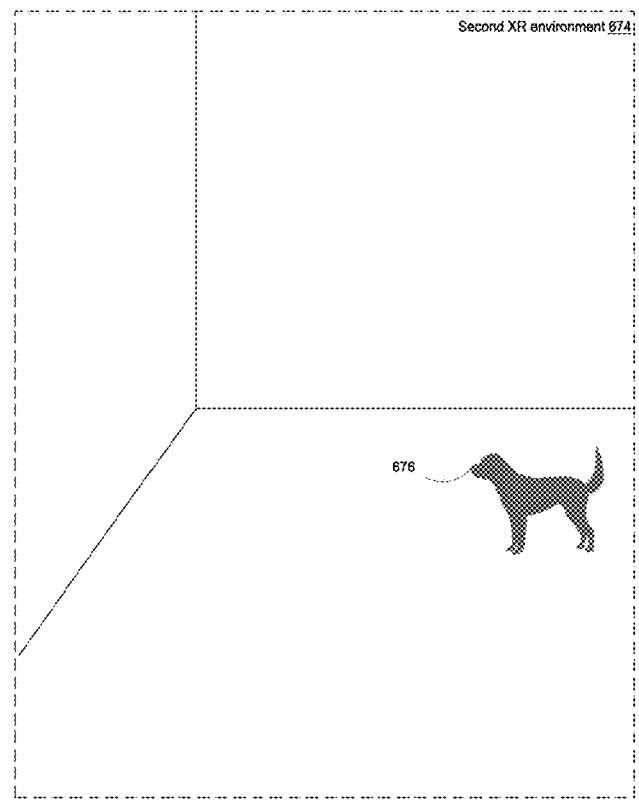
Figure 6H:
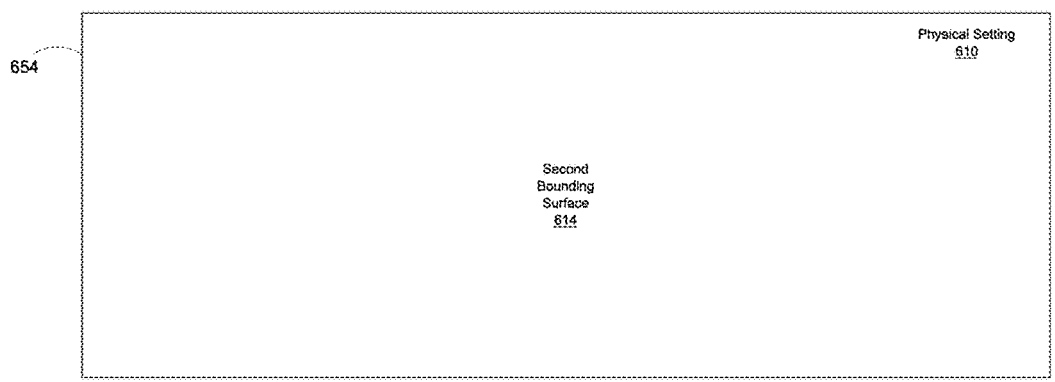

On the other hand, in some implementations, the electronic device 652 determines that the electronic device 652 does not satisfy the navigation condition with respect to a second XR environment 674 and thus maintains the portion of the physical setting 610, as illustrated in FIG. 6F-6H. As illustrated in FIG. 6F, the second XR environment 674 includes a virtual dog 676. As illustrated in FIG. 6G, the electronic device 652 detects a touch 678 that is directed to the second bounding surface 614. In response to detecting the touch 678, the electronic device 652 determines that the electronic device 652 does not satisfy the navigation condition with respect to the second XR environment 674. For example, the electronic device 652 does not satisfy the navigation condition with respect to the second XR environment 674 because the second XR environment 674 has been designated as a secure environment and the electronic device 652 has not previously operated within the second XR environment 674. Accordingly, as illustrated in FIG. 6H, the display device 654 of the electronic device 652 maintains display of the second bounding surface 614 of the physical setting 610, rather than displaying a portion of the second XR environment 674.

Figure 6I:
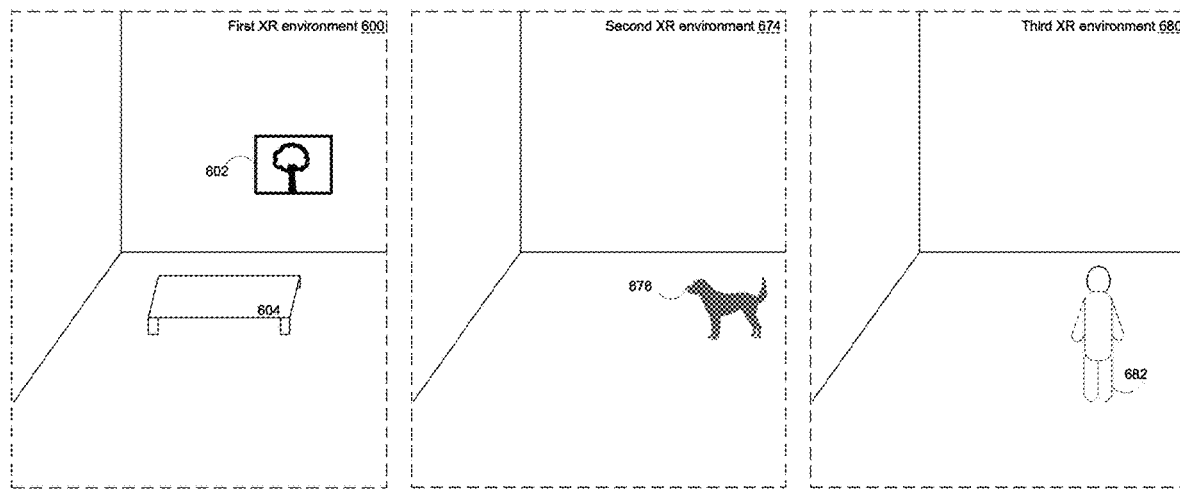
Figure 6I:
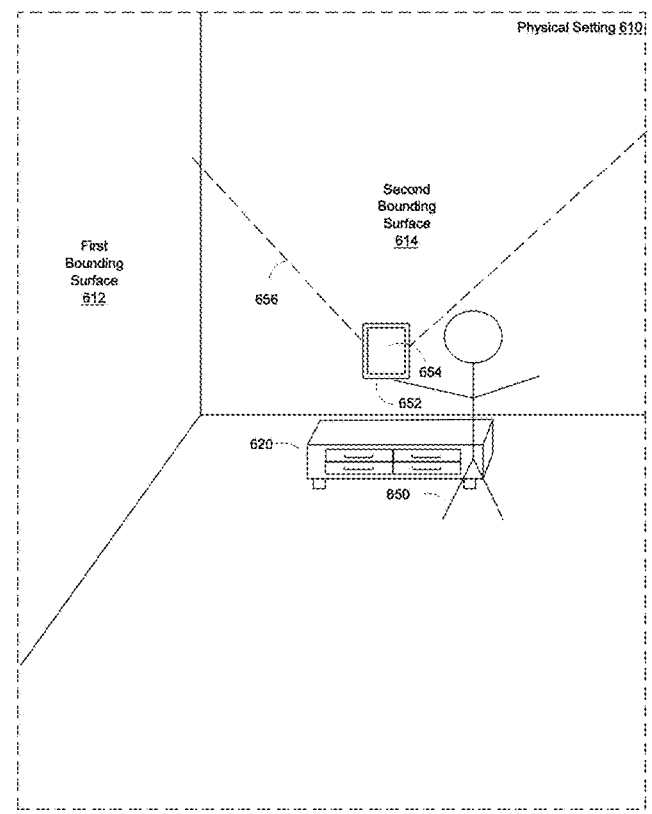

In some implementations, as illustrated in FIG. 6I-6M, the second bounding surface 614 is associated with multiple XR environments, and the electronic device 652 provides virtual navigation with respect to a portion of the multiple XR environments. Namely, as illustrated in FIG. 6I, the electronic device 652 obtains the first XR environment 600, the second XR environment 674, and a third XR environment 680 that includes an individual 682. As described above, the electronic device 652 satisfies the navigation condition with respect to the first XR environment 600, but not with respect to the second XR environment 674. Moreover, the electronic device 652 satisfies the navigation condition with respect to the third XR environment 680, because, for example, the individual 682 has granted access to the user 650 of the electronic device 652.

Figure 6J:
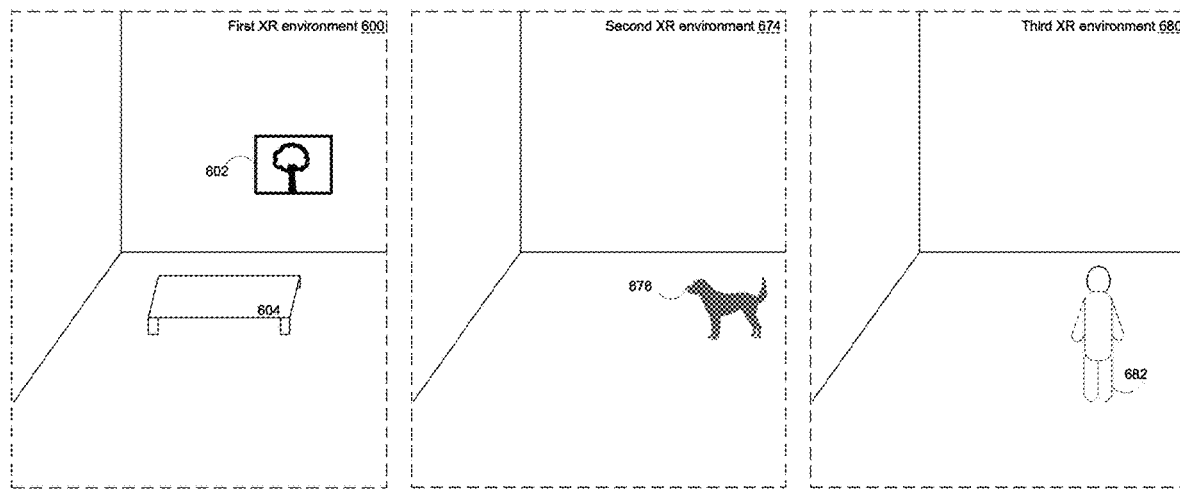
Figure 6J:
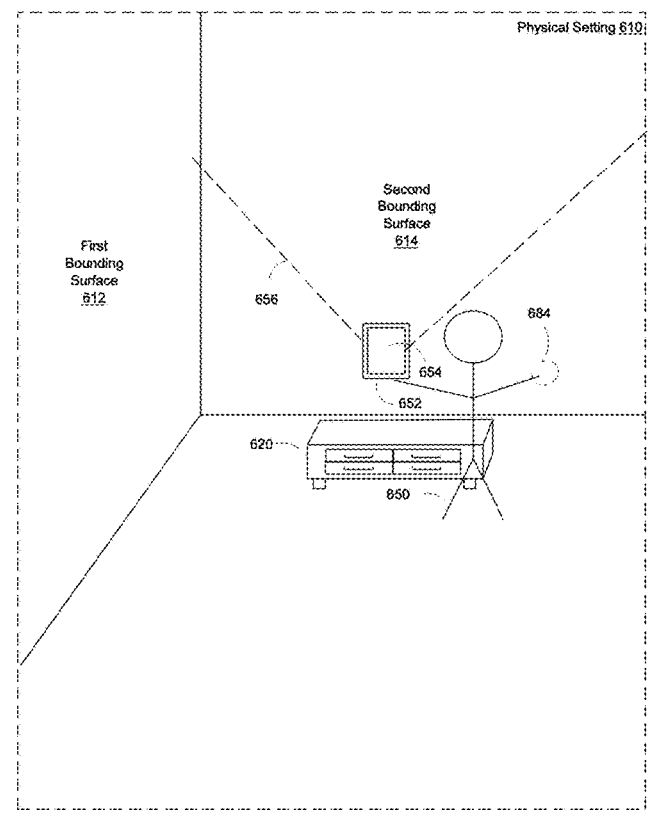
Figure 6K:
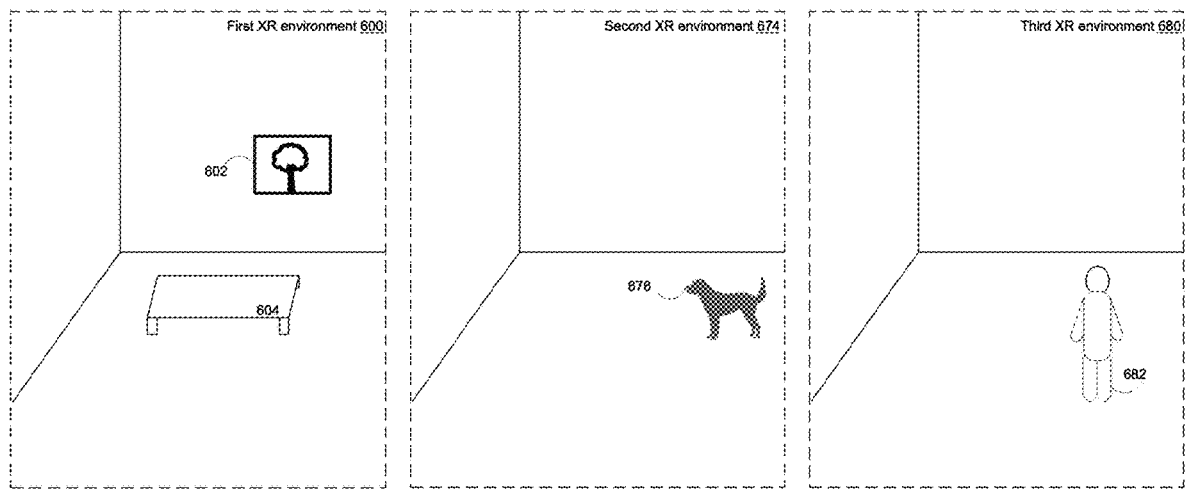
Figure 6K:
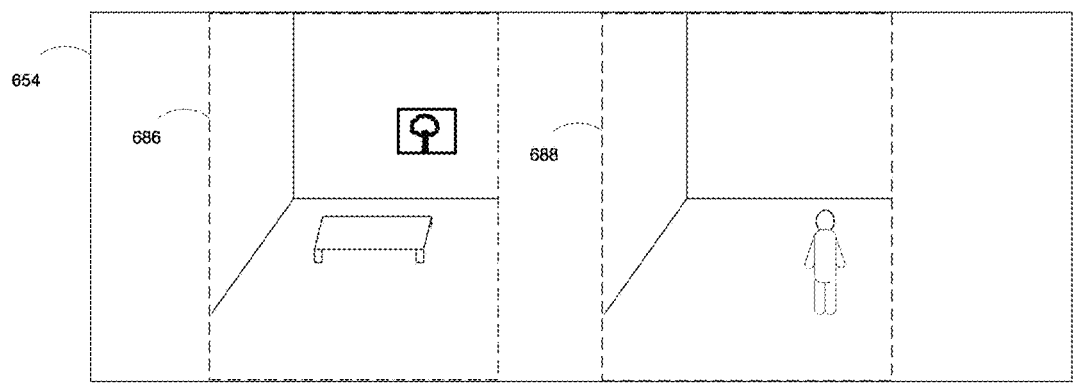

As illustrated in FIG. 6J, the electronic device 652 detects a touch 684 that is directed to the second bounding surface 614. In response to detecting the touch 684 in FIG. 6J, the electronic device 652 provides virtual navigation to the first XR environment 600 and the third XR environment 680 that both satisfy the navigation condition, but not to the second XR environment 674 that does not satisfy the navigation condition. For example, as illustrated in FIG. 6K, in some implementations, the display device 654 of the electronic device 652 replaces the portion of the first physical setting 610 with a first preview 686 and a second preview 688 respectively corresponding to the first XR environment 600 and the second XR environment 680.

Figure 6L:
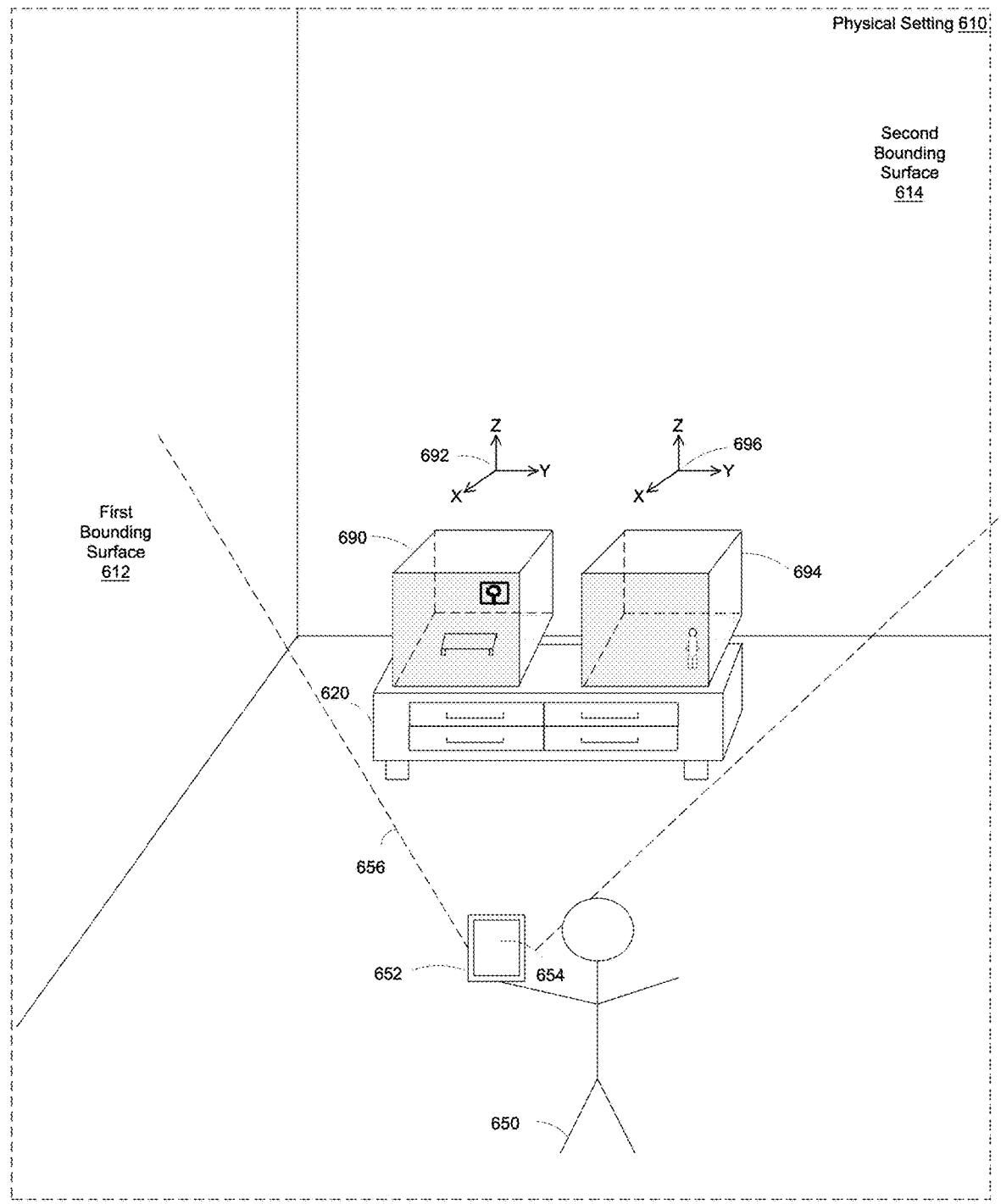
Figure 6M:
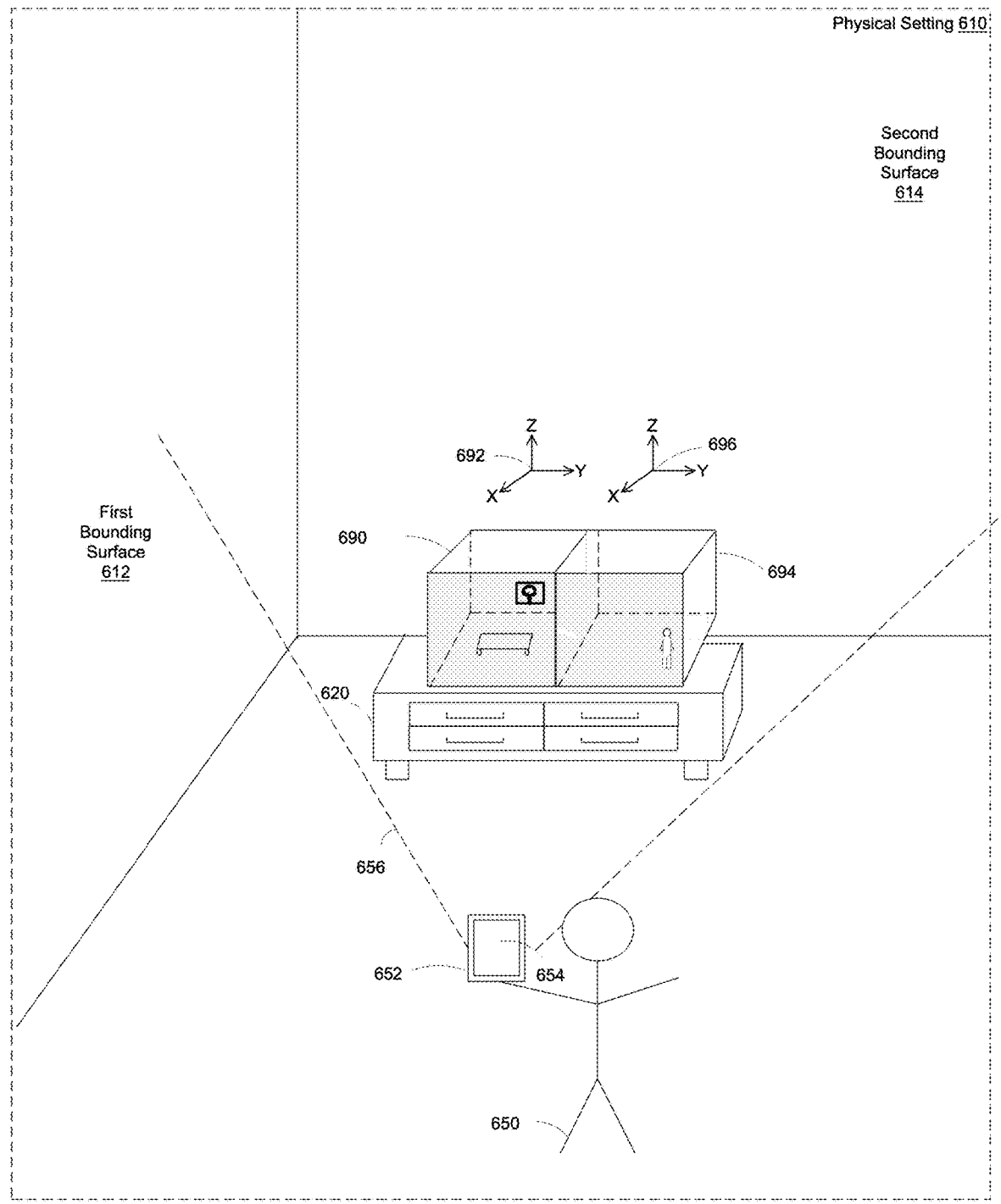

In some implementations, the electronic device 652 displays, via the display device 654, one or more diorama-view representations of XR environments that are anchored to physical objects within the physical setting 610. For example, as illustrated in FIG. 6L, in some implementations, after the user 650 has moved away from the physical credenza 620, the electronic device 652 displays a first diorama-view representation 690 that is separate from (e.g., not touching) a second diorama-view representation 694. The first diorama-view representation 690 and the second diorama-view representation 694 are anchored to (e.g., atop or abutting) the physical credenza 620. The first diorama-view representation 690 visually represents the first XR environment 600, and the second diorama-view representation 694 visually represents the third XR environment 680. As discussed above, the first XR environment 600 and the third XR environment 680 both satisfy the navigation condition. As another example, in some implementations, the first diorama-view representation 690 is touching the second diorama-view representation 694, as illustrated in FIG. 6M. The first diorama-view representation 690 and the second diorama-view representation 694 are anchored to (e.g., atop or abutting) the physical credenza 620.

The first diorama-view representation 690 includes the XR painting 602 and the XR table 604 arranged in a spatial relationship according to first XR world coordinates 692 associated with the first XR environment 600. For example, the first XR world coordinates 692 define a respective set of points existing in a 3D space. The second diorama-view representation 694 includes the individual 682 arranged in a spatial relationship according to second XR world coordinates 696 associated with the third XR environment 680. For example, the second XR world coordinates 696 define a respective set of points existing in a 3D space. One of ordinary skill in the art will appreciate that the diorama-view representations may include any number and types of XR objects arranged in a variety of ways. One of ordinary skill in the art will appreciate that the electronic device 652 may identify physical objects within the physical setting 610 according to a variety of methods, such as instance segmentation and/or semantic segmentation.

Figure 7:
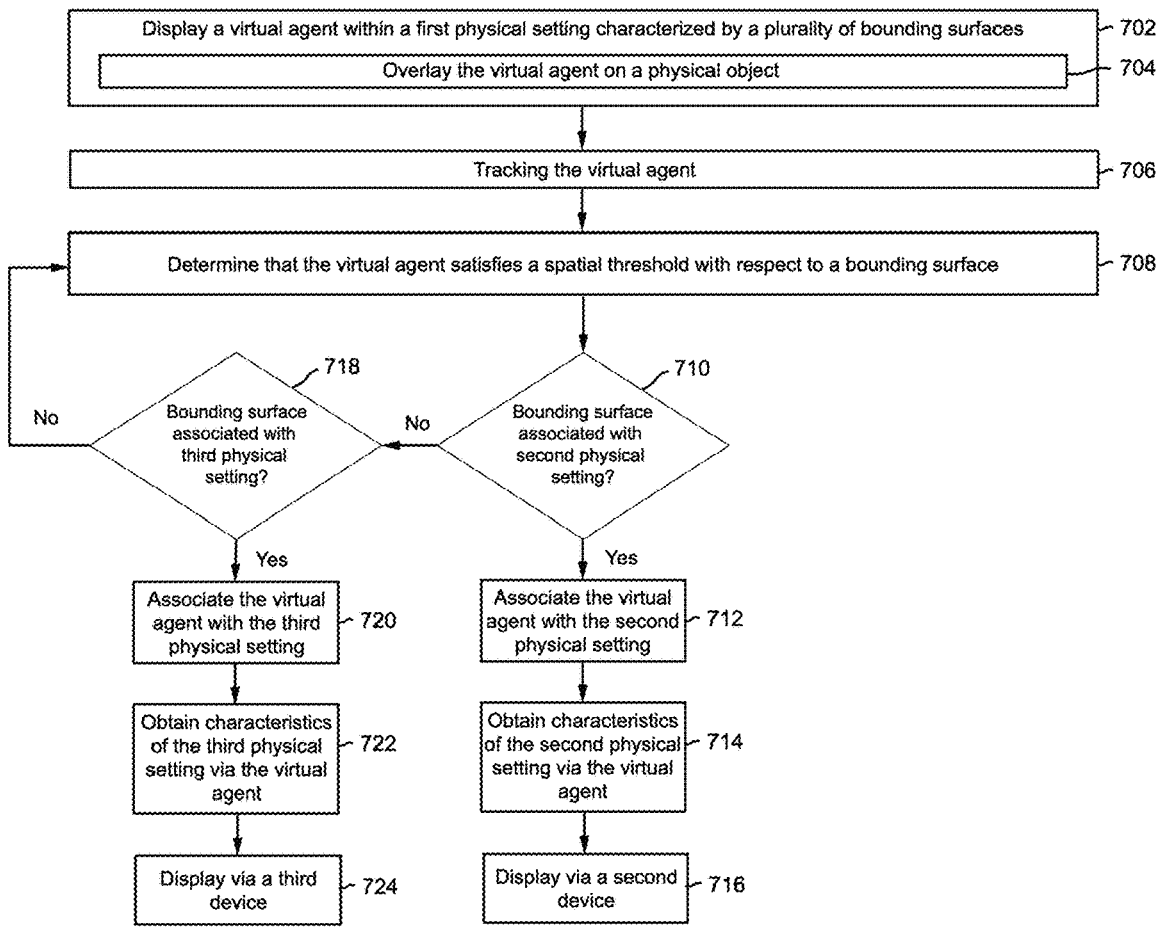
FIG. 7 is a flow diagram of a method of sharing a virtual agent across distinct physical settings in accordance with some implementations.

FIG. 7 is a flow diagram of a method 700 of sharing a virtual agent across distinct physical settings in accordance with some implementations. In various implementations, the method 700 or portions thereof are performed by an electronic device and/or an HMD. In some implementations, the method 700 is performed by processing logic, including hardware, firmware, software, or a combination thereof. In some implementations, the method 700 is performed by a processor executing code stored in a non-transitory computer-readable medium (e.g., a memory). In various implementations, some operations in method 700 are, optionally, combined and/or the order of some operations is, optionally, changed.

As represented by block 702, the method 700 includes displaying, via a display device, a virtual agent within a first physical setting. The first physical setting is characterized by a plurality of bounding surfaces, such as the first bounding surface 320 and the second bounding surface 322 of the first physical setting 300 illustrated in FIG. 3A. For example, the plurality of bounding surfaces includes a combination of walls, floors, ceilings, etc. As represented by block 704, in some implementations, displaying the virtual agent within the first physical setting includes overlaying the virtual agent on a physical element within the first physical setting. For example, the virtual agent is overlaid on a floor, on a table, etc.

As represented by block 706, in some implementations, the method 700 includes tracking the virtual agent within the first physical setting. For example, the method 700 includes tracking via instance segmentation, such as identifying objects without an understanding of their meanings (e.g., "Object No. 1," "Object No. 2," etc.). As another example, the method 700 includes tracking via semantic segmentation, including determining a meaning or understanding associated with objects (e.g., "a dog," "a head of the dog", etc.). In some implementations tracking the virtual agent includes monitoring positional changes of the virtual agent within the first physical setting.

As represented by block 708, the method 700 includes determining that the virtual agent, or a new location of the virtual agent (e.g., based on a movement of the virtual agent within a physical setting), satisfies a spatial threshold with respect to a particular one of the plurality of bounding surfaces. As one example, with reference to FIG. 3D, the electronic device 312 determines that the virtual dog 330 satisfies the spatial threshold because the virtual dog 330 has crossed the spatial threshold line 334 that is associated with the first bounding surface 320. As another example, the virtual agent satisfies the spatial threshold when the virtual agent is less than a threshold distance away from the particular one of the plurality of bounding surfaces. As another example, the virtual agent satisfies the spatial threshold when a portion of the virtual agent (e.g., the head of the virtual dog 330) crosses a spatial threshold line.

As represented by block 710, in some implementations, the method 700 includes determining whether or not the particular one of the plurality of bounding surfaces is associated with a second physical setting that is spatially distinct from the first physical setting. In accordance with a determination that the particular one of the plurality of bounding surfaces is associated with the second physical setting ("Yes" branch from decision block 710), as represented by block 712, the method 700 includes associating the virtual agent with the second physical setting, ceasing to display a first portion of the virtual agent in association with the first physical setting, and transmitting, to a second device, an instruction to display at least a portion of the virtual agent within the second physical setting. For example, ceasing to display the first portion of the virtual agent corresponds to ceasing to display the entirety of the virtual agent in association with the first physical setting, such as illustrated in FIG. 3E. As another example, ceasing to display the first portion of the virtual agent includes maintaining display of a second portion of the virtual agent within the first physical setting, such as is illustrated in FIG. 3F.

As represented by block 714, in some implementations, the method 700 includes, after associating the virtual agent with the second physical setting, obtaining, from the second device, characteristics of the second physical setting via the virtual agent. For example, the characteristics of the second physical setting include avatar information that represent one or more individuals within the second physical setting. As another example, in some implementations, while being associated with the second physical setting, the virtual agent determines its viewing frustrum (e.g., field of view) with respect to the second physical setting. Continuing with this example, the virtual agent provides its viewing frustrum to the electronic device performing the method 700. The viewing frustrum may include the one or more individuals within the second physical setting.

As represented by block 716, in some implementations, the method 700 includes receiving, at the second device, the instruction to display the virtual agent within the second physical setting, and in response to receiving the instruction, displaying the first portion of the virtual agent via a second display device of the second device. For example, with reference to FIG. 3E, the second device 352 receives a first set of instructions from the electronic device 312, and, in response thereto, displays the entire virtual dog 330. As another example, with reference to FIG. 3F, the second device 352 receives a second set of instructions from the electronic device 312, and, in response thereto, displays a portion of the virtual dog 330.

In accordance with a determination that the particular one of the plurality of bounding surfaces is not associated with the second physical setting ("No" branch from decision block 710), the method 700 continues to block 718. As represented by block 718, in some implementations, the method 700 includes determining whether or not the particular one of the plurality of bounding surfaces is associated with a third physical setting that is spatially distinct from the first physical setting.

In accordance with a determination that the particular one of the plurality of bounding surfaces is not associated with the third physical setting ("No" branch from decision block 718), the method 700 reverts back to block 708. In some implementations, although not illustrated, the method 700 determines whether or not the particular one of the plurality of bounding surfaces is associated with a fourth physical setting that is spatially distinct from the first physical setting.

On the other hand, in accordance with a determination that the particular one of the plurality of bounding surfaces is associated with the third physical setting ("Yes" branch from decision block 718), the method 700 continues to blocks 720, 722, 724 with respect to the third physical setting and a third device. The functions of blocks 720, 722, and 724 respectively mirror the functions of blocks 712, 714, and 716.

Figure 8:
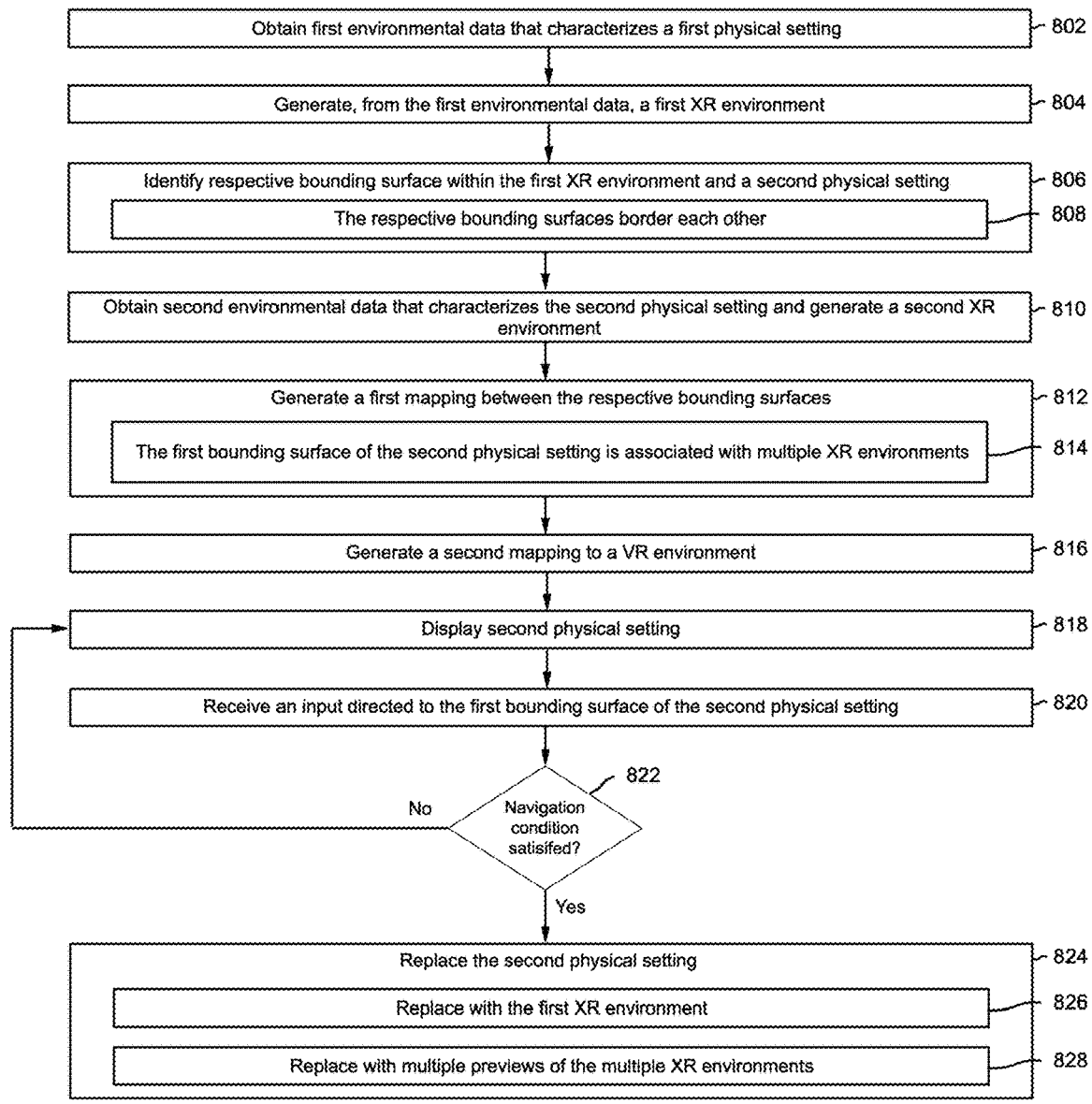
FIG. 8 is a flow diagram of a method of mapping a physical setting to an XR environment in accordance with some implementations.

FIG. 8 is a flow diagram of a method 800 of mapping a physical setting to an XR environment in accordance with some implementations. In various implementations, the method 800 or portions thereof are performed by an electronic device (e.g., the electronic device 100 in FIG. 1 or the electronic device 652 in FIGS. 6A-6L) and/or an HMD. In some implementations, the method 800 is performed by the system 410 in FIG. 4. In some implementations, the method 800 is performed by processing logic, including hardware, firmware, software, or a combination thereof. In some implementations, the method 800 is performed by a processor executing code stored in a non-transitory computer-readable medium (e.g., a memory). In various implementations, some operations in method 800 are, optionally, combined and/or the order of some operations is, optionally, changed.

As represented by block 802, the method 800 includes obtaining first environmental data that characterizes a first physical setting. The first physical setting is spatially distinct from a second physical setting. The second physical setting is associated with (e.g., includes) the electronic device. As one example, with reference to FIG. 4, the system 410 obtains the first environmental data that characterizes the first physical setting 402. In some implementations, the first physical setting is associated with an individual that is remotely located with respect to the electronic device.

As represented by block 804, the method 800 includes generating, from the first environmental data, a first extended reality (XR) environment corresponding to the first physical setting. For example, with reference to FIG. 4, the system 410 includes an extended reality generator 416 that generates the first XR environment based on the first environmental data that characterizes the first physical setting 402. As another example, with reference to FIG. 5B, an electronic device or HMD generates the first XR environment 514 based on environmental data associated with the first physical setting 510.

As represented by block 806, in some implementations, the method 800 includes identifying, within the first XR environment, the first bounding surface of the first XR environment, and identifying, within the second physical setting, the first bounding surface of the second physical setting. For example, with reference to FIG. 4 and FIG. 5C, the bounding surface identifier 418 of the system 410 identifies the first bounding surface 512 of the first XR environment 514 (associated with the first physical setting 510) and identifies the third bounding surface 529 of the second physical setting 520. In some implementations, identifying bounding surfaces includes utilizing a combination of instance segmentations and semantic segmentation. As represented by block 808, in some implementations, a portion of the first bounding surface of the first XR environment and a portion of the first bounding surface of the second physical setting share a volumetric region. For example, the volumetric region is a portion of a wall of the second physical setting.

As represented by block 810, in some implementations, the method 800 includes obtaining second environmental data that characterizes the second physical setting, and generating, from the second environmental data, a second XR environment corresponding to the second physical setting. For example, with reference to FIG. 4 and FIG. 5B, the extended reality generator 416 of the system 410 generates the second XR environment 524 based on second environmental data that is associated with the second physical setting 520. The system 410 may retrieve the second environmental data from the environmental data buffer 414.

As represented by block 812, the method 800 includes generating a first mapping between a first bounding surface of the second physical setting and a first bounding surface of the first XR environment. For example, with reference to FIG. 4 and FIG. 5A, the bounding surface mapper 420 generates a first mapping between the first bounding surface 512 of the first physical setting 510 and the first bounding surface 522 of the second XR environment 524.

In some implementations, as represented by block 814, the first bounding surface of the second physical setting is associated with a plurality of XR environments including the first XR environment. As an example, with reference to FIG. 6I, the second bounding surface 614 of the physical setting 610 is associated the first XR environment 600, the second XR environment 674, and the third XR environment 680. As another example, the first bounding surface of the second physical setting is associated with three individuals located in three distinct physical locations, such as three different rooms in three different buildings.

In some implementations, as represented by block 816, the method 800 includes generating a second mapping between a second bounding surface of the second physical setting and a virtual reality environment. For example, with reference to FIG. 4 and FIG. 5C, the bounding surface mapper 420 generates a second mapping between the first bounding surface 522 of the second physical setting 520 and the first VR environment 530. As another example, the VR environment separates and connects the second physical setting with the first XR environment. The VR environment may be generated or obtained, such as from the VR environment datastore 422 in FIG. 4.

In some implementations, as represented by block 818, the method 800 includes displaying, via display device included in an electronic device (e.g., a display panel integrated within an HMD), a portion of the second physical setting. For example, with reference to FIG. 6C, the display device 654 of the electronic device 652 displays a portion of the physical setting 610 including the second bounding surface 614. In some implementations, as represented by block 820, the method 800 includes receiving, via one or more input devices included in the electronic device, an input directed to the first bounding surface of the second physical setting. Continuing with the previous example, as illustrated in FIG. 6D, the electronic device 652 detects a touch 662 directed to the second bounding surface 614.

In some implementations, as represented by block 822, the method 800 includes, in response to receiving the input directed to the first bounding surface of the second physical setting, determining whether or not the electronic device satisfies a navigation condition.

In some implementations, the electronic device satisfies the navigation condition when a currently operating user profile associated with the electronic device satisfies an access level condition. For example, a parent wearing an HMD has a supervisory access level and thus can virtually navigate to any room in a house. On the other hand, in some implementations, the electronic device does not satisfy the navigation condition when a child wearing the same HMD has a secondary access level and thus cannot virtually navigate to, for example, the parent's room.

In some implementations, the electronic device satisfies the navigation condition when, before receiving the input, the electronic device is associated with the first physical setting. For example, the electronic device has operated within the first physical setting before receiving the input. On the other hand, in some implementations, the electronic device does not satisfy the navigation condition because the electronic device has not operated while being physically located in the first physical setting.

In response to determining that the electronic device does not satisfy the navigation condition ("No" branch in FIG. 8), the method 800 maintains display of the portion of the second physical setting, as represented by block 818. As one example, in response to receiving the touch 678 directed to the second bounding surface 614 in FIG. 6G, the electronic device 652 determines that the electronic device 652 does not satisfy the navigation condition and thus maintains display of the second bounding surface 614 in FIG. 6H.

On the other hand, in response to determining that the electronic device satisfies the navigation condition ("Yes" branch in FIG. 8), the method 800 continues to a portion of the method 800 represented block 824. Namely, as represented by block 824, in some implementations, the method 800 includes replacing the portion of the second physical setting. As represented by block 826, in some implementations, the method 800 includes replacing the portion of the second physical setting with a portion of the first XR environment. For example, in response to receiving the touch 662 directed to the second bounding surface 614 in FIG. 6D, the electronic device 652 determines that the electronic device 652 satisfies the navigation condition and replaces display of the second bounding surface 614 with the first XR environment 600 in FIG. 6E.

In some implementations, in some implementations, the method 800 includes replacing the portion of the second physical setting with a plurality of previews of the plurality of XR environments, such as described above with reference to block 814. For example, in response to receiving the touch 684 directed to the second bounding surface 614 in FIG. 6J, the electronic device 652 replaces display of the second bounding surface 614 with the first preview 786 of the first XR environment 600 and the second preview 788 of the third XR environment 680. As another example, in some implementations, the plurality of previews corresponds to a plurality of transparent window panes, each of which providing a preview of a respective one of the plurality of XR environments.

Figure 9:
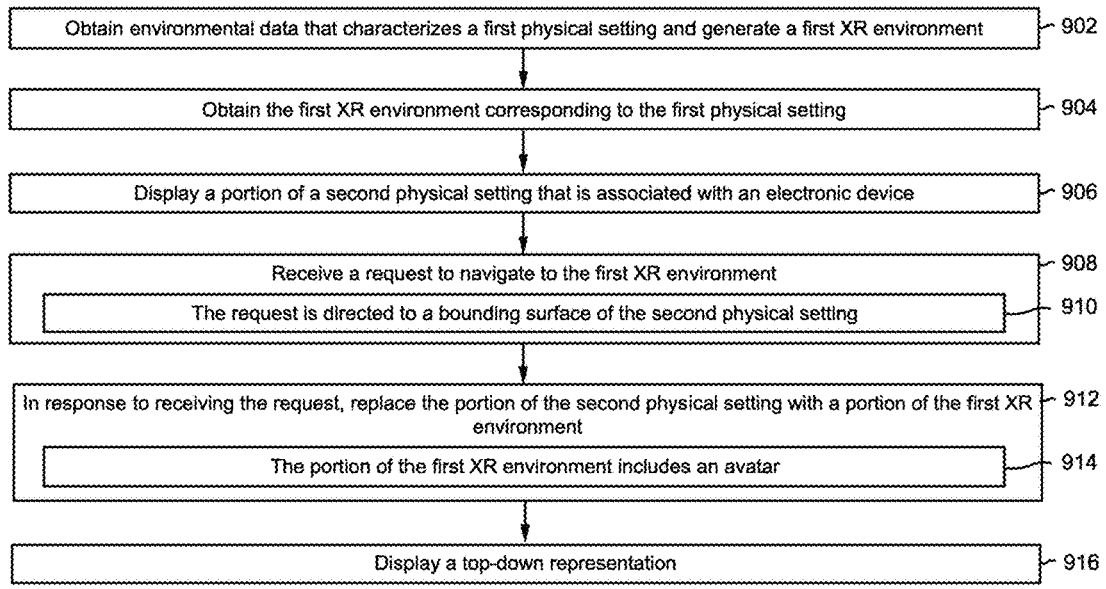
FIG. 9 is a flow diagram of a method of enabling virtual navigation to an XR environment in accordance with some implementations.

FIG. 9 is a flow diagram of a method 900 of enabling virtual navigation to an XR environment in accordance with some implementations. In various implementations, the method 900 or portions thereof are performed by an electronic device (e.g., the electronic device 100 in FIG. 1) and/or an HMD, such as the electronic device 652 illustrated in FIGS. 6A-6L. In some implementations, the method 900 is performed by processing logic, including hardware, firmware, software, or a combination thereof. In some implementations, the method 900 is performed by a processor executing code stored in a non-transitory computer-readable medium (e.g., a memory). In various implementations, some operations in method 900 are, optionally, combined and/or the order of some operations is, optionally, changed.

As represented by block 902, in some implementations, the method 900 includes obtaining environmental data that characterizes the first physical setting, and generating the first XR environment based on the environmental data. The first XR environment corresponds to a first physical setting. For example, an electronic device obtains the environmental data from a second device that is associated with (e.g., included in) the first physical setting. The second device may be remotely located with respect to the electronic device, which is configured to perform the method 900.

As represented by block 904, the method 900 includes obtaining the first XR environment, such as the first XR environment 600 illustrated in FIGS. 6A-6E.

As represented by block 906, the method 900 includes displaying a portion of a second physical setting that is associated with the electronic device. The second physical setting is spatially distinct from the first physical setting. For example, as illustrated in FIG. 6A, the electronic device corresponds to the electronic device 652, which is included in the physical setting 610.

As represented by block 908, the method 900 includes, while displaying the portion of the second physical setting, receiving, via one or more input devices, a request to navigate to the first XR environment. As represented by block 910, the request is directed to a bounding surface of the second physical setting. For example, in some implementations, the method 900 includes displaying an XR affordance overlaid on the portion of the second physical setting, wherein the request is directed to the XR affordance. As another example, in some implementations, the method 900 includes obtaining eye tracking data via an eye tracking sensor included in the electronic device. Receiving the request includes determining that the eye tracking data is indicative of an eye gaze that is directed to the bounding surface. For example, the eye gaze corresponds to one of a point of regard or a focus area/region. As yet another example, in some implementations, the method 900 includes obtaining hand tracking data via a hand tracking sensor included in the electronic device. Receiving the request includes determining that the hand tracking data is indicative of hand movement that is directed to the bounding surface. For example, a user's hand contacts the bounding surface or is a threshold distance from the bounding surface, such as is illustrated in FIG. 6D. As yet another example, in some implementations, the method 900 includes obtaining positional data via an inertial measurement unit (IMU) included in the electronic device. Receiving the request includes determining that the positional data is indicative of the electronic device that is directed to the bounding surface. For example, the electronic device is flicked towards the bounding surface, such as when a user, wearing an HMD, turns the user's head towards the bounding surface.

As represented by block 912, the method 900 includes, while displaying the portion of the second physical setting, in response to receiving the request, replacing the portion of the second physical setting with a portion of the first XR environment. For example, in response to detecting the touch 662 directed to the second bounding surface 614 in FIG. 6D, the electronic device 652 replaces display of the portion of the physical setting 610 (e.g., within the field-of-view 656) with a portion of the first XR environment 600 via the display device 654, as illustrated in FIG. 6E. In some implementations, as represented by block 914, the portion of the first XR environment includes an avatar of an individual associated with the first physical setting.

As represented by block 916, in some implementations, the method 900 includes displaying a top-down representation of the portion of the second physical setting and the portion of the first XR environment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device including a display, one or more processors and a non-transitory memory:
obtaining first environmental data that characterizes a first physical setting that is spatially distinct from a second physical setting, wherein the second physical setting includes the electronic device;
generating, using the first environmental data, a first extended reality (XR) environment corresponding to the first physical setting;

identifying a first wall of the first XR environment corresponding to a first wall of the first physical setting;

identifying a first wall of the second physical setting;

presenting, via the display, a second XR environment that corresponds to the second physical setting where the electronic device is located; and while presenting the second XR environment that corresponds to the second physical setting:

detecting a user input associated with the first wall of the second physical setting; and in response to detecting the user input, replacing presentation of the second XR environment with the first XR environment.

2. The method of claim 1, wherein the electronic device replaces presentation of the second XR environment with the first XR environment when a currently operating user profile associated with the electronic device satisfies an access level condition.

3. The method of claim 1, wherein the electronic device replaces presentation of the second XR environment with the first XR environment when, before receiving the input, the electronic device is associated with the first physical setting.

4. The method of claim 1, wherein the electronic device corresponds to a head-mountable device (HMD) that includes the display, wherein a portion of the second physical setting is within a field-of-view associated with the HMD.

5. The method of claim 1, wherein identifying the first wall of the first XR environment includes determining an identifier of the first wall of the first XR environment, identifying the first wall of the second physical setting includes determining an identifier of the first wall of the second physical setting, and the method further comprises generating a mapping that includes the identifier of the first wall of the first XR environment to the identifier of the first wall of the second physical setting.

6. The method of claim 5, wherein a portion of the first wall of the first XR environment and a portion of the first wall of the second physical setting share a volumetric region.

7. The method of claim 5, further comprising generating a second mapping between a second wall of the second physical setting and a virtual reality environment.

8. The method of claim 7, wherein the second XR environment includes the virtual reality environment and the second physical setting including the second wall.

9. An electronic device comprising:

one or more processors;

a display;

a non-transitory memory; and one or more programs, wherein the one or more programs are stored in the non-transitory memory and configured to be executed by the one or more processors, the one or more programs including instructions for:

obtaining first environmental data that characterizes a first physical setting that is spatially distinct from a second physical setting, wherein the second physical setting includes the electronic device;

generating, using the first environmental data, a first extended reality (XR) environment corresponding to the first physical setting;

identifying a first wall of the first XR environment corresponding to a first wall of the first physical setting;

identifying a first wall of the second physical setting;

presenting, via the display, a second XR environment that corresponds to the second physical setting where the electronic device is located; and while presenting the second XR environment that corresponds to the second physical setting:

detecting a user input associated with the first wall of the second physical setting; and in response to detecting the user input, replacing presentation of the second XR environment with the first XR environment.

10. The electronic device of claim 9, wherein the electronic device replaces presentation of the second XR environment with the first XR environment when a currently operating user profile associated with the electronic device satisfies an access level condition.

11. The electronic device of claim 9, wherein the electronic device replaces presentation of the second XR environment with the first XR environment when, before receiving the input, the electronic device is associated with the first physical setting.

12. A non-transitory computer readable storage medium storing one or more programs, the one or more programs comprising instructions, which, when executed by an electronic device with a display, one or more processors, cause the electronic device to:

obtain first environmental data that characterizes a first physical setting that is spatially distinct from a second physical setting, wherein the second physical setting includes the electronic device;

generate, using the first environmental data, a first extended reality (XR) environment corresponding to the first physical setting;

identify a first wall of the first XR environment corresponding to a first wall of the first physical setting;

identify a first wall of the second physical setting;

present, via the display, a second XR environment that corresponds to the second physical setting where the electronic device is located; and while presenting the second XR environment that corresponds to the second physical setting:

detect a user input associated with the first wall of the second physical setting; and in response to detecting the user input, replace presentation of the second XR environment with the first XR environment.

13. The electronic device of claim 9, wherein the one or more programs further include instructions for:

detecting that a virtual object in the first XR environment has crossed a spatial threshold associated with the first wall of the first XR environment;

ceasing to display the virtual object in the first XR environment; and displaying the virtual object in the second XR environment.

14. The electronic device of claim 12, wherein detecting the user input comprises detecting a user of the electronic device physically interacting with the first wall of the second physical setting.

15. The electronic device of claim 12, wherein detecting the user input comprises detecting a user of the electronic device gazing at the first wall of the second physical setting for a threshold amount of time.

* * * * *